United States Patent
Zhang et al.

(10) Patent No.: US 6,348,992 B1
(45) Date of Patent: *Feb. 19, 2002

(54) STERICALLY STABILIZED POLYENE-BRIDGED SECOND-ORDER NONLINEAR OPTICAL CHROMOPHORES AND DEVICES INCORPORATING THE SAME

(75) Inventors: Cheng Zhang, Los Angeles; Harold R. Fetterman, Pacific Palisades; William Steier, San Marino; Joseph Michael, Los Angeles, all of CA (US)

(73) Assignee: Pacific Wave Industries, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,685

(22) Filed: Apr. 18, 2000

Related U.S. Application Data

(63) Continuation-in-part of application No. 09/546,930, filed on Apr. 11, 2000, which is a continuation-in-part of application No. 09/488,422, filed on Jan. 20, 2000, which is a continuation-in-part of application No. 09/122,806, filed on Jul. 27, 1998, now Pat. No. 6,067,186.

(51) Int. Cl.[7] .............................. G02F 1/00; F21V 9/00; H10S 3/00

(52) U.S. Cl. ........................ 359/321; 252/582; 359/345

(58) Field of Search ............................. 359/321, 345, 359/252, 279; 252/582

(56) References Cited

U.S. PATENT DOCUMENTS

| | | | |
|---|---|---|---|
| 3,821,182 A | 6/1974 | Baird, Jr. et al. | 428/20 |
| 3,879,330 A | 4/1975 | Lustig | 525/129 |
| 3,932,693 A | 1/1976 | Shaw et al. | 428/518 |

(List continued on next page.)

OTHER PUBLICATIONS

L. R. Dalton et al., "From molecules to opto–chips: organic electro–optic materials," *J. Mater. Chem.*, 1999, 9, 1905–1920.

(List continued on next page.)

*Primary Examiner*—Georgia Epps
*Assistant Examiner*—David N. Spector
(74) *Attorney, Agent, or Firm*—Henricks, Slavin & Holmes LLP

(57) ABSTRACT

Sterically stabilized polyene-bridged second-order nonlinear chromophores and devices incorporating the same are embodied in a variety of chromophore materials, and particularly in chromophore materials are configured within an oxygen-free operating environment. An exemplary preferred chromophore includes an electron donor group, an electron acceptor group and a π-conjugate bridge structure therebetween. The bridge is a polyene structure having a five-, six- or seven-membered ring to lock one carbon-carbon double bond. The bridge contains an unlocked conjugate diene unit which connects the bridge ring and the acceptor. Another exemplary preferred chromophore includes an electron donor group, an electron acceptor group and a ring-locked bridge structure between the electron donor group and the electron acceptor group. The bridge structure includes a fused double-or triple-ring structure which functions to lock two or three double bonds. The bridge also contains an unlocked conjugate diene unit to connect the the bridge ring and the acceptor. Another exemplary preferred chromophore includes an electron donor group, an acceptor, and a bridge structure therebetween, wherein the acceptor is a five- or six-membered ring locked tricyano electron acceptor. Another exemplary preferred chromophore includes an electron donor group, an electron acceptor group, and a bridge structure therebetween, with the bridge structure including a bithiophene unit. A preferred host polymer for the chromophores is poly[bisphenol A carbonate-co-4,4'-(3,3,5-trimethylcyclohexylidene)diphenol carbonate].

20 Claims, 18 Drawing Sheets

U.S. PATENT DOCUMENTS

| | | | |
|---|---|---|---|
| 4,048,428 A | 9/1977 | Baird, Jr. et al. | 526/343 |
| 4,064,296 A | 12/1977 | Bornstein et al. | 428/34.9 |
| 4,284,671 A | 8/1981 | Cancio et al. | 428/36.9 |
| 4,837,293 A | 6/1989 | Silvis et al. | 528/99 |
| 4,914,138 A | 4/1990 | Percec et al | 525/71 |
| 4,945,134 A | 7/1990 | Wallace et al. | 525/301 |
| 5,017,411 A | 5/1991 | Chen-Tsai et al. | 428/36.6 |
| 5,039,751 A | 8/1991 | Wallace et al. | 525/301 |
| 5,079,321 A | 1/1992 | Sperling et al. | 526/311 |
| 5,093,466 A | 3/1992 | Patton et al. | 528/343 |
| 5,196,147 A | 3/1993 | Taketani et al. | 252/589 |
| 5,223,603 A | 6/1993 | Patton et al. | 528/343 |
| 5,290,630 A | 3/1994 | Devonald et al. | 428/333 |
| 5,370,937 A | 12/1994 | Lee et al. | 428/448 |
| 5,432,286 A | 7/1995 | Cabrera et al. | 546/281.1 |
| 5,440,446 A | 8/1995 | Shaw et al. | 361/301.58 |
| 5,500,302 A | 3/1996 | Phillips et al. | 428/474.4 |
| 5,514,799 A | 5/1996 | Varanasi et al. | 544/300 |
| 5,535,048 A | 7/1996 | Mignani et al. | 359/326 |
| 5,549,853 A | 8/1996 | Beckmann et al. | 252/582 |
| 5,609,555 A | 3/1997 | Lee et al. | 493/210 |
| 5,637,365 A | 6/1997 | Carlblom | 428/35.4 |
| 5,663,308 A | 9/1997 | Gibbons et al. | 534/573 |
| 5,670,603 A | 9/1997 | Wu et al. | 528/190 |
| 5,676,884 A | 10/1997 | Tiers et al. | 252/582 |
| 5,679,763 A | 10/1997 | Jen et al. | 528/403 |
| 5,686,126 A | 11/1997 | Noel et al. | 426/127 |
| 5,688,906 A | 11/1997 | Jen et al. | 528/353 |
| 5,697,744 A | 12/1997 | Medal | 411/82 |
| 5,698,134 A | 12/1997 | Jubb et al. | 252/299.01 |
| 5,707,691 A | 1/1998 | Plester et al. | 427/472 |
| 5,714,304 A | 2/1998 | Gibbons et al. | 430/270.1 |
| 5,718,845 A | 2/1998 | Drost et al. | 252/582 |
| 5,725,909 A | 3/1998 | Shaw et al. | 427/412.1 |
| 5,738,806 A | 4/1998 | Beckmann et al. | 252/582 |
| 5,783,306 A | 7/1998 | Therien et al. | 428/411.1 |
| 5,804,101 A | 9/1998 | Marder et al. | 252/582 |
| 5,846,638 A | 12/1998 | Meissnet | 428/220 |
| 5,854,866 A | 12/1998 | Leonard | 385/39 |
| 5,882,785 A | 3/1999 | Hollins et al. | 428/333 |
| 5,883,259 A | 3/1999 | Kim et al. | 548/224 |
| 5,885,672 A | 3/1999 | Phillips et al. | 428/35.2 |
| 5,887,116 A | 3/1999 | Grote | 385/2 |
| 5,889,131 A | 3/1999 | Kim et al. | 526/262 |
| 5,892,859 A | 4/1999 | Grote | 285/2 |

OTHER PUBLICATIONS

L. R. Dalton, "Polymeric electro–optic materials: optimization of electro–optic activity, minimization of optical loss, and fine–tuning of device performance," *Opt. Eng.* 39(3) 589–595 (Mar. 2000).

T. M. Londergan et al., "Dendrimer Functionalized NLO Chromophores," *Polymer Preprints* 2000, 41(1), 783–784.

H. Ma et al., "A Novel Class of High–Perfomance Perfluorocyclobutate–Containing Polymers for Second–Order Nonlinear Optics," *Chem. Mater.* 2000, 12, 1187–1189 (Published on Web Apr. 7, 2000).

N. Nemoto et al., "Novel Types of Polyesters Containing Second–Order Nonlinear Optically Active Chromophores with High Density," *Macromolecules* 1996, 29, 2365–2371.

Z. Sekkat et al., "Room–Temperature Photoinduced Poling and Thermal Poling of a Rigid Main–Chain Polymer with Polar Azo Dyes in the Side Chain," *Chem. Mater.* 1995, 7, 142–147.

S. Yokoyama et al., "Second harmonic generation of dipolar dendrons in the assembled thin films," *Thin Solid Films* 331 (1998) 248–253.

S. Yokoyama et al., "Intermolecular Coupling Enhancement of the Molecular Hyperpolarizabilliy in Multichromophoric Dipolar dendrons," *J. Am. Chem. Soc.* 2000, 122(13), 3174–3181 (Published on Web Mar. 11, 2000).

C. Zhang et al., "Chromophore Incorporating Fluorinated Aromatic Polyester for Electro–optic Applications," *Polymer Preprints* 40(2) Aug. 1999.

Y. Zhang et al., "A new hyperbranched polymer with polar chromophores for nonlinear optics," *Polymer* (1997), 38(12), 2893–2897.

D. G. Girton, et al., "20 GHz electro–optic polymer Mach–Zehnder modulator", *Applied Physcis Letters*, vol. 58, No. 16, pp. 1730–1732 (1991).

D. M. Burland, et al., "Second–Order Nonlinearity in Poled–Polymer Systems", *Chemcial Reviews*, vol. 94, pp. 31–75 (1994).

S. Kalluri, "Improved poling and thermal stability of sol–gel nonlinear optical polymers", *Applied Physics Letters*, vol. 65, No. 21, pp. 2651–2653 (1994).

I. Cabrere, et al., "A New Class of Planar–Locked Polyene Dyes for Nonlinear Optics", *Advanced Materials*, vol. 6, pp. 43–45 (1994).

W. Wang, "40–GHz Polymer Electrooptic Phase Modulators", *IEEE Photonics Technology Letters*, vol. 7, No. 6, pp. 638–640 (1995).

L. R. Dalton, et al., "Sythesis and Processing of Improved Organic Second–Order Nonlinear Optical Materials for Applications in Photonics", *Chemistry of Materials*, vol. 7, pp. 1060–1081 (1995).

S. Kalluri, "Monolithic Integration of Waveguide Polymer Electronic Modulators on VLSI Circuitry", *IEEE Photonics Technology Letters*, vol. 8, No. 5, pp. 644–646 (1996).

Y. Shi, et al., "Fabrication and Characterization of High–Speed Polyurethane–Disperse Red 19 Integrated Electrooptic Modulators for Analog System Applications", *IEEE Journal of Selected Topics in Quantum Electronics*, vol. 2, No. 2, pp. 289–299 (1996).

C. Shu, et al., "Synthesis of second–order nonlinear optical chromophores with enhanced thermal stability: a conformation–locked trans–polyene approach", *Chemical Communication*, pp. 2279–2280 (1996).

A. Chen, "Optimized Oxygen Plasma Etching of Polyurethane–Based Electro–optic Polymer for Low Loss Optical Waveguide Fabrication", *Journal of Electrochemical Society*, vol. 143, No. 11, pp. 3648–3651 (1996).

D. X. Zhu, "Noncollinear four–wave mixing in a broad area semiconductor optical amplifier", *Applied Physics Letters*, vol. 70, No. 16, pp. 2082–2084 (1997).

D. Chen, "Demonstration of 110GHz electro–optic polymer modulators", *Applied Physics Letters*, vol. 70, No. 25, pp. 3335–3337 (1997).

L. Dalton, "Polymeric electro–optic modulators", *Chemistry & Industry*, pp. 510–514 (1997).

S. Ermer, "Synthesis and Nonlinearity of Triene Chromophores Containing the Cyclohexen Ring Structure", *Chemistry of Materials*, vol. 9, pp. 1437–1442 (1997).

A. Harper, et al., "Translating microscopic optical nonlinearity into macroscopic optical nonlinearity: the role of chromophore–chromophore electrostatic interactions", *Journal of Optical Society of America: B*, vol. 15, No. 1, pp. 329–337 (1998).

A. Chen, et al., "Low–V$_\pi$ electro–optic modular with high–$\mu\beta$ chromophore and a constant–bias field", *Optics Letters*, vol. 23, No. 6, pp. 478–480 (1998).

C. Shu, et al., Nonlinear Optical Chromophores with Configuration–Locked Polyenes Possessing Enhanced Thermal Stability and Chemical Stability, *Chemistry of Materials*, vol. 10, pp. 3284–3286 (1998).

(Ia)

(Ib)

(Ic)

| Chromophroes | λ_max (nm) in dioxane | λ_max (nm) in chloroform |
|---|---|---|
| [structure] | 640 | 705 |
| [structure] | 646 | 715 |
| [structure] | 629.8 | 662.6 |
| [structure] | 632.4 | 692.2 |
| [structure] | 637 | 689 |
| [structure] | 631 | 676 |
| [structure] | 707 | 812 |

FIG. 2

| Structure | | |
|---|---|---|
| (structure with NBu₂ donor) | 648 | 709 |
| (structure with N(CH₂CH₂OH)₂ donor) | 628.4 | 660.8 |
| (structure with N(CH₂CH₂OTBDMS)₂ donor) | 633.8 | 689.2 |
| (structure with N(CH₂CH₂OMe)₂ donor) | 633 | 672 |
| (structure with N(CH₂CH₂OAc)₂ donor) | 613 | 653 |

FIG. 4

ABFTC        CLD-48

Chemical structure of CLD-1

US 6,348,992 B1

STERICALLY STABILIZED POLYENE-BRIDGED SECOND-ORDER NONLINEAR OPTICAL CHROMOPHORES AND DEVICES INCORPORATING THE SAME

CROSS-REFERENCE TO RELATED APPLICATIONS

This application is a continuation-in-part of U.S. patent application Ser. No. 09/122,806 entitled "New Class of High Hyperpolarizability Organic Chomophores and Process for Synthesizing the Same" filed on Jul. 27, 1998, now U.S. Pat. No. 6,067,186, a continuation-in-part of U.S. patent application Ser. No. 09/488,422 entitled "Sterically Stabilized Second-Order Nonlinear Optical Chromophores and Devices Incorporating the Same" filed on Jan. 20, 2000 and a continuation-in-part of U.S. patent application Ser. No. 09/546,930 entitled "Sterically Stabilized Second-Order Nonlinear Optical Chromophores With Improved Stability and Devices Incorporating the Same" filed on Apr. 11, 2000.

STATEMENT REGARDING FEDERALLY SPONSORED RESEARCH AND DEVELOPMENT

This invention was made with support from the government of the United States of America under Contracts F49620-97-C-0064, F49620-97-1-0307, F49620-97-1-0491, F49620-98-C-0059, F49620-98-C-0077, F49620-99-0040 awarded by the United States Air Force. The government of the United States of America has certain rights in this invention as provided by these contracts.

BACKGROUND OF THE INVENTION

1. Field of the Invention

The present invention relates to nonlinear optical chromophores and, more particularly, pertains to sterically stabilized second-order nonlinear optical chromophores and devices incorporating the same.

2. Description of the Related Art

Organic second-order nonlinear optical (NLO) materials have received increasing attention for applications involving signal processing and communications. One of the challenges in this field is to design and synthesize second-order NLO chromophores (the active components of second-order nonlinear optical materials) that simultaneously possess large first molecular hyperpolarizabilities ($\beta$), good chemical and thermal stability, and optical transparency at optical communication wavelengths (1.3 and 1.55 $\mu$m). Chromophore intermolecular electrostatic interactions prevent the simple scaling of molecular optical nonlinearity into macroscopic optical nonlinearity. Such interactions strongly attenuate the efficient induction of acentric chromophore order (hence, electro-optic activity) by electric field poling or self-assembly methods. Chromophores with $\beta$ values many times those of the well-known Disperse Red 19 dye are thus required to obtain electro-optic coefficients comparable to or higher than those of the leading commercial material crystalline lithium niobate.

The value of $\beta$ for a chromophore can be increased by using a diene moiety in place of thiophene in the conventional phenylethenylenethiophene $\pi$-conjugated bridge. Moreover, this enhancement in $\beta$ can be accomplished without an increase in the wavelength of the charge-transfer absorption $\lambda_{max}$. However, the resulting phenylpolyene bridge has poor thermal stability unless the polyene structure is sterically protected. The synthesis of various sterically-protected (ring-locked) phenylpolyene chromophores involves cyclic enones such as isophorone, verbenone and double-ring locked dienone as starting materials and intermediates. The Knovenegal coupling reaction between enones and electron acceptors is the critical step in both backward and forward methods reported. The low reactivity of enone severely limits the choice of acceptor to only a few molecules including malononitrile, isoxazolone, and thiobarbituric acid and therefore has become the bottleneck in the development of ring-locked phenylpolyene-bridged high $\beta$ chromophores.

In addition to microscopic and macroscopic nonlinearity, the photochemical stability of second-order NLO material has long been recognized as another major problem which must be solved for successful employment of these materials in commercial devices. Chemical degradation of the NLO chromophore in polymer film can be caused by photoinduced chemical reaction and thermal decomposition. In an oxygen-containing environment (e.g., air), a major cause of chromophore degradation is photoinduced oxidation of the chromophore. Photooxidation changes the chromophore to a new species that is effectively electro-optically inactive.

Researchers have been trying to improve the photochemical stability of NLO chromophores by modifying their chemical structure. The results of their efforts indicate that the stability can be improved by avoiding adjacent alkyl groups on the nitrogen donor of the chromophore [See, U.S. Pat. No. 5,776,375 to Hofstraat, et al.], by using aromatic substituents on the nitrogen donor, by using azo bridge linkage instead of a carbon-carbon double bond, and by attaching a radical scavenger to the chromophore [See, Optics Letters, 2000, Vol. 25, no. 5, 332–334, Andriana Galvan-Gonzalz, et al.]. It has also been found that shorter chromophores generally have higher photochemical stability in air. However, due to the strong dependence of molecular nonlinearity on chromophore conjugation length, short chromophores cannot provide a sufficient degree of nonlinearity for practical applications [Cheng, L.-T.; Tam, W.; Marder, S. R.; Stiegman, A. E.; Rikken, G.; Spangler, C. W. *J. Phys. Chem.* 1991, 95, 10643–10652. Marder, S. R.; Cheng, L.-P.; Tiemann, B. G.; Friedli, A. C.; Blanchard-Desce, M.; Perry, J. W.; Skindhøj, J. *Science,* 1994, 263, 511–514. Wong, K. Y.; Jen, A. K.-Y.; Rao, V. P. *Phys. Rev.* 1994, 49, 3077–3080.].

In addition to the chemical decomposition of the chromophore, light can also cause randomization of electric poling-induced alignment. In this process, although the chromophore chemical structure is not destroyed, the material will still lose all nonlinear activity evantually. To address this aspect of the photo-related problem, one would need to modified the chromophore structure to reduce or eliminate certain structural units that could lead to the unwanted random motion of the chromophore backbone, and to find a more rigid yet processible polymer host to restrict free motion of the chromophore. Since the properties (microscopic nonlinearity, macroscopic, chemical and thermal stability, etc.) of second-order nonlinear optical materials are inter-related, optimization of one property often causes unacceptable amounts of attenuation in other properties. Thus, a systematic approach to addressing both the stability and nonlinearity issues is needed for a balanced improvement in both properties. An approach based on chromophore structure modification has been addressed in the parent U.S. patent application Ser. No. 09/546,930. The present invention provides a solution to the photochemical issue associated with NLO materials, a solution which does not sacrifice requirements of molecular nonlinearity and high poling efficiency.

SUMMARY OF THE INVENTION

A new class of ring-locked aminophenylpolyenal donor-bridges has been developed. These new donor-bridges, according to the present invention, have very high Knovenegal reactivity and have been coupled with a variety of acceptors bearing acidic methyl or methylene groups (including the most desired TCF and TCI type of acceptors shown in FIG. 11) to obtain a new class of second-order NLO chromophores. This methodology broadens the scope of polyene-bridged chromophores without significantly sacrificing thermal stability or optical transparency. This synthetic approach leads to the development of device-quality NLO chromophores (shown in FIG. 1) possessing $\mu\beta$ values (where $\mu$ is the chromophore dipole moment) of $15,000 \times 10^{-48}$ esu or greater at 1.9 $\mu$m as determined by the electric field induced second harmonic generation (EFISH) technique.

A variety of different molecular structures are possible for the chromophores of the present invention. An exemplary preferred basic chromophore structure according to the present invention includes an electron donor group, an electron acceptor group and a $\pi$-conjugate bridge structure therebetween. The bridge is a polyene structure having a five-, six- or seven-membered ring to lock one carbon-carbon double bond. Uniquely, the bridge contains an unlocked conjugate diene unit to connect the bridge ring and the acceptor (A). In a preferred embodiment, the bridge structure also includes at least one bulky side group.

Another exemplary preferred chromophore according to the present invention includes an electron donor group, an electron acceptor group and a ring-locked bridge structure between the electron donor group and the electron acceptor group. The bridge structure comprises a fused double- or triple-ring structure which functions to lock two or three double bonds. The bridge also contains an unlocked conjugate diene unit to connect the bridge ring and the acceptor (A). In a preferred embodiment, the bridge structure also includes at least one bulky side group.

Another exemplary preferred chromophore according to the present invention includes an electron donor group, an acceptor, and a bridge structure therebetween, wherein the acceptor is a five- or six-membered ring-locked tricyano electron acceptor.

Another exemplary preferred chromophore according to the present invention includes an electron donor group, an electron acceptor group, and a bridge structure therebetween, with the bridge structure including a bithiophene unit. In a preferred embodiment, the bithiophene unit is modified with side group(s).

The NLO materials of the present invention are suitable for a wide range of devices. Functions performed by these devices include, but are not limited to, the following: electrical to optical signal transduction; radio wave to millimeter wave electromagnetic radiation (signal) detection; radio wave to millimeter wave signal generation (broadcasting); optical and millimeter wave beam steering; and signal processing such as analog to digital conversion, ultrafast switching of signals at nodes of optical networks, and highly precise phase control of optical and millimeter wave signals. These materials are suitable for arrays which can be used for optical controlled phased array radars and large steerable antenna systems as well as for electro-optical oscillators which can be used at high frequencies with high spectral purity.

A new approach according to the present invention for solving the critical photochemical stability problem has been developed by studying the photochemical decomposition behavior of high $\mu\beta$ chromophores in air and in an inert gas environment. More specifically, it has been observed that the careful removal of oxygen from the material in the device and from the environment of the device yields a material which is stable at high optical power for 5 days without any observable drop in its optical properties. This result demonstrates that the major mechanism of chromophore photodegradation, the photochemical degradation of chromophores, can be eliminated by removing oxygen from the material in the device and from the environment of the device. According to the present invention, any polymeric electro-optic device (especially those using high $\mu\beta$ chromophores) can be protected from oxygen thus solving the problem of chromophore photodegradation. An exemplary preferred way of providing this protection according to the present invention is to hermetically package the device in a container filled with an inert gas. Another exemplary preferred way of providing this protection according to the present invention is to insulate the device from air (oxygen, in particular) by coating the electro-optic device with a polymeric material which has a very low permeativity for oxygen.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 2 illustrates exemplary preferred subclass Ia chromophores according to the present invention;

FIG. 4 illustrates exemplary preferred subclass Ia chromophores with an alkyl side group at the middle ring according to the present invention;

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

This application is a continuation-in-part of U.S. patent application Ser. No. 09/122,806 entitled "New Class of High Hyperpolarizability Organic Chromophores and Process for Synthesizing the Same" filed on Jul. 27, 1998, a continuation-in-part of U.S. patent application Ser. No. 09/488,422 entitled "Sterically Stabilized Second-Order Nonlinear Optical Chromophores and Devices Incorporating the Same" filed on Jan. 20, 2000 and a continuation-in-part of U.S. patent application Ser. No. 09/488,422 entitled "Sterically Stabilized Second-Order Nonlinear Optical Chromophores With Improved Stability and Devices Incorporating the Same" filed on Apr. 11, 2000, the disclosures of which are incorporated herein by reference in their entirety.

Figure 1:
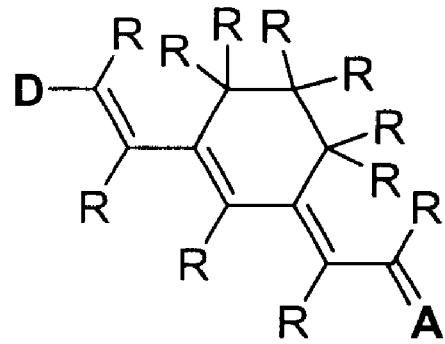
FIG. 1 illustrates the basic structure of class I chromophores according to the present invention.
Figure 1:
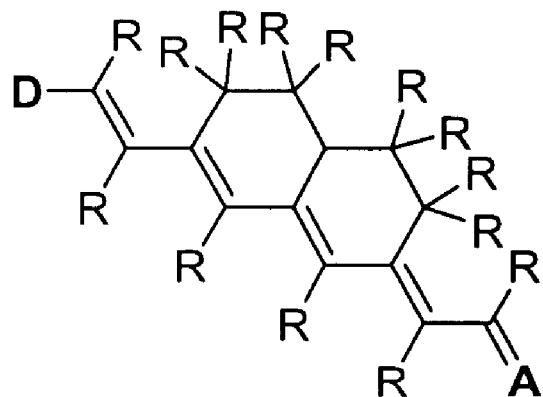
Figure 1:
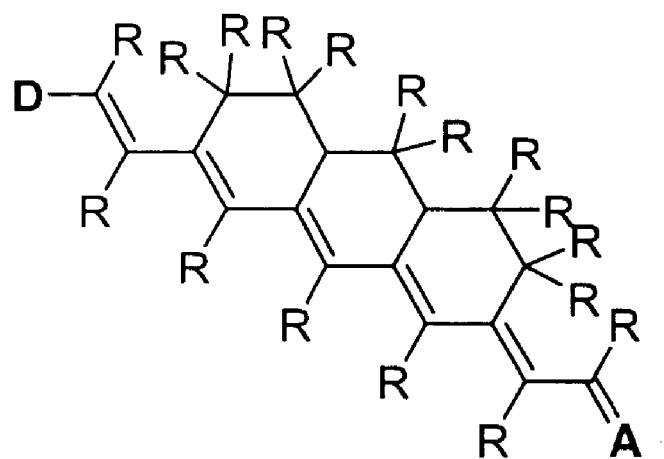

Referring to FIG. 1, three molecular chromophore structures according to the present invention are subclass Ia, Ib and Ic chromophores. Each chromophore includes an electron donor group ("D"), an electron acceptor group ("A") and a bridge structure therebetween. As shown in FIG. 1, in the exemplary preferred chromophores, the electron acceptor group is connected to the (fused) ring structure of the polyene bridge with a conjugated diene. See, C. Zhang, A. S. Ren, F. Wang, J. Zhu, L. Dalton, "Synthesis and Characterization of Sterically Stabiliized Second-Order Nonlinear Optical Chromophores", Chem. Mater. 1999, 11, 1966–1968, which is incorporated herein by reference. The R group=H, F, or any perhalogenated, halogenated or non-halogenated aliphatic or aromatic group with 1–30 carbon atoms functionalized with zero or more of functional groups: hydroxy, ether, ester, amino, silyl, and siloxy, and R groups at different positions are not necessarily the same.

Figure 14:
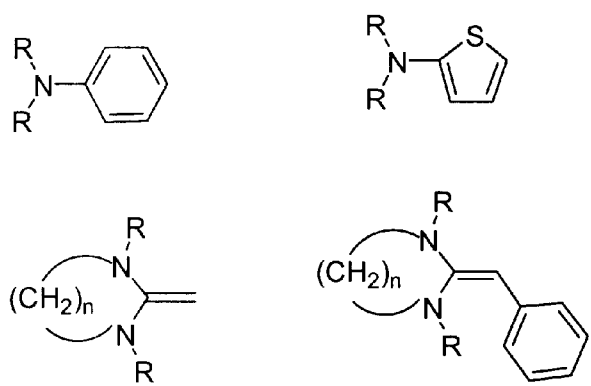
FIG. 14 illustrates some representative electron donors used in chromophores according to the present invention.

Exemplary preferred structures for the electron donor (D) are shown in FIG. 14.

Figure 11:
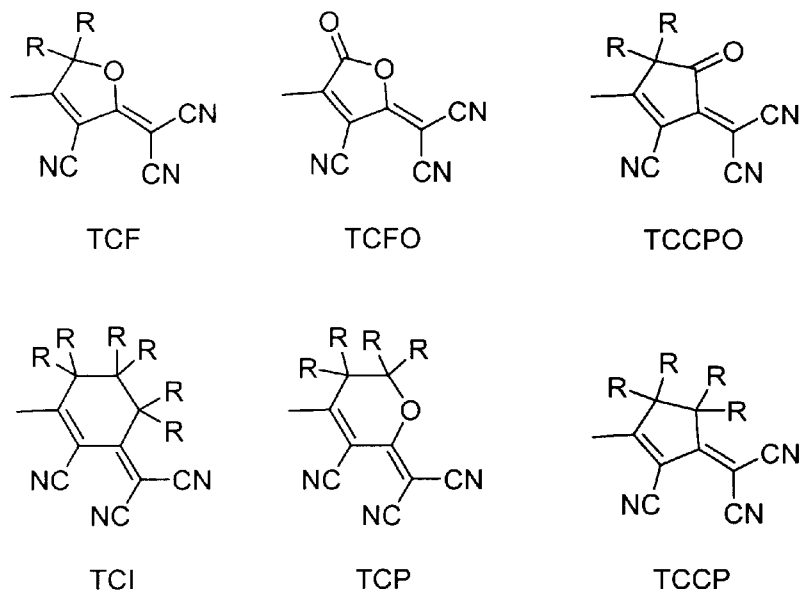
FIG. 11 illustrates exemplary preferred ring-locked tricyano electron acceptors for the chromophores according to the present invention.
Figure 15:
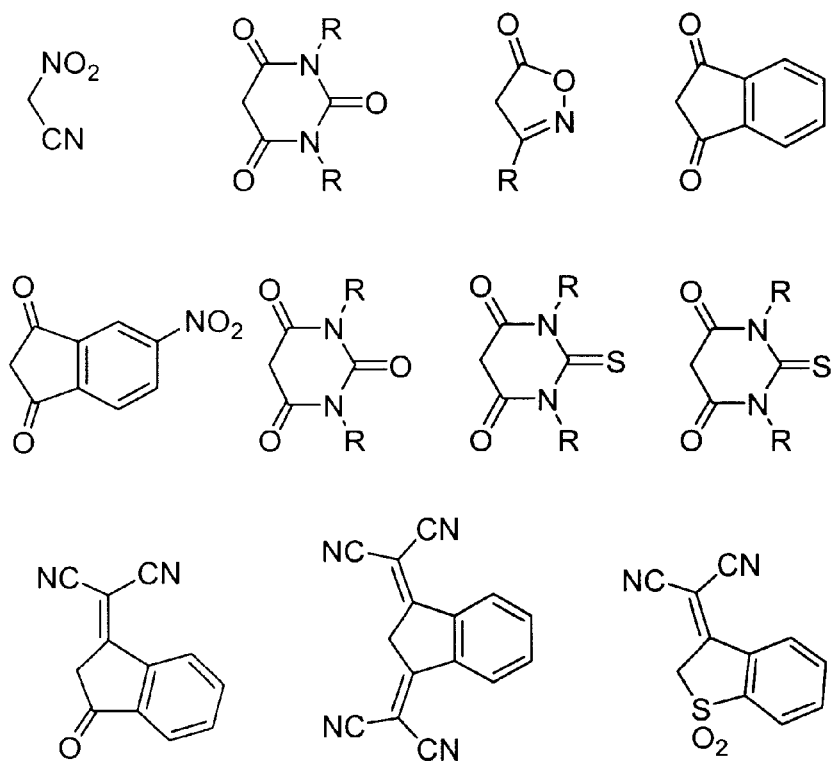
FIG. 15 illustrates some conventional electron acceptors used in the construction of some of the chromophores according to the present invention.

Exemplary preferred structures for the electron acceptor group are shown in FIGS. 11 and 15. The electron acceptor groups preferably have five-member or six-member rings. However, rings with seven or more members can also be employed.

Generally, it has been observed that dipole moment and molecular hyperpolarizability increase from subclass Ia chromophores to subclass Ic. Final device performance (electro-optic activity) is related to the product of dipole moment and hyperpolarizability. A corresponding increase in molecular nonlinearity over this series has been observed.

A large number of variations of the class I chromophores have been synthesized, characterized, and utilized in the fabrication of prototype devices by modifying the starting materials in the general synthetic schemes presented herein and in the aforementioned parent U.S. patent applications.

Exemplary preferred subclass Ia chromophores according to the present invention are shown in FIGS. 2 and 4.

Synthesis of A Subclass Ia Chromophore

Figure 3:
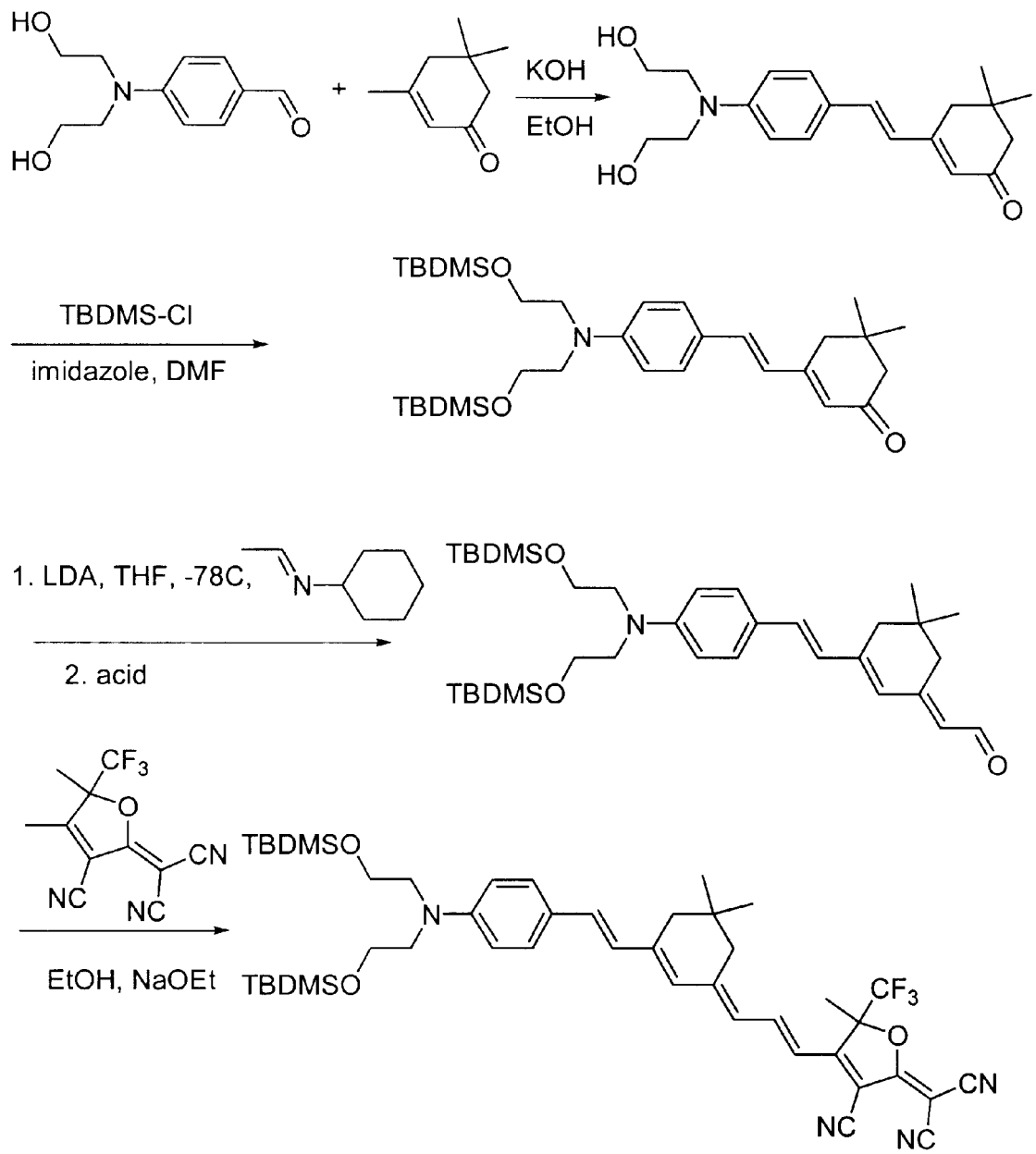
FIG. 3 illustrates an exemplary preferred method for synthesizing a subclass Ia chromophore according to the present invention.

Referring to FIG. 3, an exemplary preferred method for synthesizing SUBCLASS IA CHROMOPHORES is illustrated. The exemplary preferred method for synthesis is described below.

A mixture of 1.815 mol of p-N,N-bis(2-hydroxyethyl) aminobenzaldehyde, 2.178 mol, 301 g of isophorone, 1L of EtOH, and 2.1 mol of sodium ethoxide was stirred at 50° C. for 15 h. The reaction was stopped by adding 50 g of water. Ethanol was evaporated in vacuo and product crystallized out. The product was collected by filtration, washed with water. It was vacuumed to remove water and then recrystallized from EtOAc to give 90% yield. Mass: 329.200, found 329.199.

TBDMS protection: A mixture of 45.4 g, 138 mol of the above product, 80 g DMF, 42 g imidazole and 46 g t-butyldimethylsilyl chloride was stirred at 60° C. for 6 h. The mixture was then poured to water and extracted with hexane. The extract was condensed and the residual was purified by column chromatography to give 72.7 g product: 94.5% yield. Crystals from hexane had a melting point of 106.5–108° C. Elemental analysis: calc. C 68.88, H 9.94, N 2.51. Found C 69.04, H 9.92, N 2.48.

Extension of the ketone to aldehyde: A solution of 110 mmol, 13.77 g of N-cyclohexylacetimine in 35 ml THF was added to 77 ml 1.5M LDA/cyclohexane at −50° C. After the addition the mixture was warmed up with an ice bath and then recooled to−78° C. A solution of 61.35 g of the above ketone in 105 ml THF was added. The mixture was then warmed up in air and then acidified with dilute acetic acid solution and stirred at room temperature for 11 h. After usual work up, the crude product was purified by column chromatography to give 26.56 g pure product: 41.6% yield.

Chromophre: 5.6 mmol, 3.27 g of the above product (the donor-bridge), 5.6 mmol, 1.419 g of 3-cyano-5-methyl-5- trifluoromethyl-2-dicyanomethylene-4-methyl-2,5-dihydrofuran (The trifuoro TCF acceptor), 20 ml EtOH and 0.2 ml of 21 wt % NaOEt were mixed and refluxed for 30 min. The product precipitated and was collected by filtration. The product was washed with MeOH and then recrystalizd from EtOH. Yield: 3 g, 65%. 707 nm in dioxane, 812 nm in chloroform. Elemental analysis for $C_{45}H_{61}F_3N_4O_3Si_2$: C 65.98; H 7.51; N 6.84. Found: C 65.85; H 7.46; N 6.87.

A number of variants of this structure have been synthesized by use of modified starting materials following the general reaction scheme presented above.

Variations to the chromophores have been made to improve electro-optic activity either by sterically inhibiting unwanted intermolecular electrostatic interactions, by improving the electron-withdrawing characteristics of the acceptor end of the chromophores, by improving the electron donating characteristics of the donor end of the chromophore, or by improving electron communication of the bridge segment of the chromophore.

Referring to FIG. 4, a representative example of steric modification of the bridge segment of the subclass Ia chromophore shows the addition of a bulky side group (alkyl derivative at the middle ring) to reduce electrostatic interaction. It has been observed that the bulky side group not only enhances chromophore $\mu\beta$ value in solution (EFISH method), but also enhances electro-optic activity in the polymer matrix (See, "Importance of intermolecular interactions in the nonlinear optical properties of poled polymers" by I. Liakatas, C. Cai, M. Bosch, M. Jäger, Ch. Bosshard, and P. Günter (Switzerland), Cheng Zhang, Larry R. Dalton; Applied Physics Letters, 2000, vol 76, no. 11, pp1368–1370, which is incorporated herein by reference). It should be understood, however, that other side groups can be added. A plurality of bulky side groups, e.g., branched or tertiary side groups, can also be added to each bridge segment.

Synthesis of Sterically Modified Subclass Ia Chromophore

Figure 5:
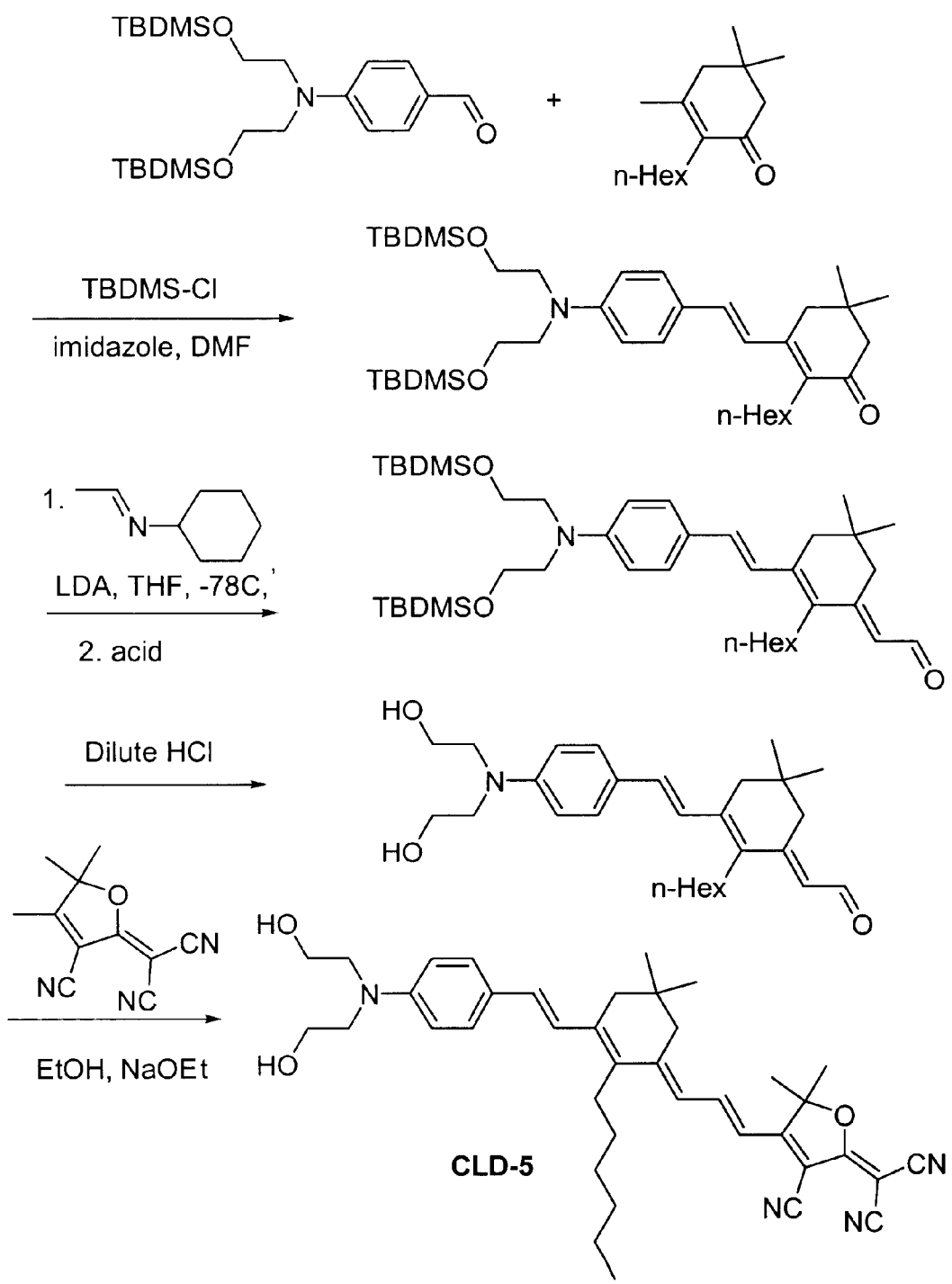
FIG. 5 illustrates an exemplary preferred method for synthesizing a sterically modified subclass Ia chromophore according to the present invention.

An exemplary preferred method for synthesizing a sterically modified SUBCLASS IA chromophore is illustrated in FIG. 5. The exemplary preferred method for synthesis is described below.

2-Hexyl-isophorone

This compound was synthesized according a literature method (Stork, G. Benaim, J. *J. Am. Chem. Soc.* 1971, 5938–5939.) from isophorone in 55% yield. $^1$H NMR (CDCl$_3$) : δ2.29 (t, 6.32 Hz, 2H), 2.23 (s, 2H), 1.92 (s, 2H), 1.30 (m, 8H), 1.00 (s, 6H), 0.88 (t, 6.42 Hz, 3H). $^{13}$C NMR (CDCl$_3$) : 67 198.55, 151.93, 134.53, 51.16, 46.75, 32.43, 31.56, 29.25, 28.90, 27.99, 24.80, 22.41, 21.04, 13.88. . Anal. Calcd. for $C_{15}H_{26}O_1$: C, 81.02; H, 11.79; Found: C, 81.18; H, 11.87.

3-[p-N,N-Bis(2-t-butyldimethylsiloxyethyl)aminostyryl]-5,5-dimethyl-2-hexyl-cyclohex-2-enone Potassium t-butoxide (30.32 g, 97%, 0.262 mol.) was added to a solution of p-N,N-Bis(2-t-butyldimethylsiloxyethyl)aminobenzaldehyde (, 53.4 g, 0.122 mol.) and 2-hexyl-isophorone (compound 10, 26.6 g, 0.118 mol.) in diglyme (200 mL, KOH dried) over 3 min. Ice bath was used to keep the temperature below 50° C. The reaction mixture was stirred at room temperature for 25 min. and then was poured to dilute acetic acid (0.28 mol HOAc in 200 mL of water). The extra acid was neutralized with saturated aqueous sodium bicarbonate. The organic layer was separated, washed with water, dried with magnesium sulfate and rotovapped to dryness. The residue was purified by a silica gel column using ethyl acetate/hexane (1/20, v/v) to afford 8.33 g red thick oil: yield 22% based on reacted starting material. $^1$H NMR (CDCl$_3$) : δ7.36 (d, 8.81 Hz, 2H), 7.14 (d, 16.06 Hz, 1H), 6.88 (d, 16.09 Hz, 1H), 6.69 (d, 8.91 Hz, 2H), 3.78 (t, 6.06 Hz, 4H), 3.56 (t, 5.89 Hz, 4H), 2.53 (br, 2H), 2.48 (s, 2H), 2.29 (s, 2H), 1.33 (m, 8H), 1.05 (s, 6H), 0.90 (s, 18H), 0.04 (s, 12H) ppm. $^{13}$C NMR (CDCl$_3$): δ198.87, 148.41, 147.67, 134.47, 134.19, 128.52, 124.38, 121.71, 111.54, 60.21, 53.42, 51.37, 39.82, 32.27, 31.65, 29.90, 29.37, 28.39, 25.79, 24.30, 22.54 ppm.

TBDMS Protected, Hexyl Derivatized Donor-bridge

A solution of lithium diisopropylamine (4.7 mL 1.5M in THF, 7.05 mmol.) in THF (12 mL) was cooled to −20° C. N-cyclohexylacetimine (6.7 mmol.) was added and the mixture was allowed to warm up to 0° C. and was kept at the temperature for 15 min. It was re-cooled to −20° C. and 3-[p-N,N-Bis(2-t-butyldimethylsiloxyethyl)aminostyryl]-5,5-dimethyl-2-hexyl-cyclohex-2-enone (4.31 g, 6.71 mmol., in 15 mL of THF) was added over 3 min. It was stirred for 5 more min. and was stopped by adding 1N acetic acid solution. The product was extracted with hexane and the extract was washed with sodium bicarbonate solution, dried with magnesium sulfate and rotovapped to dryness. The residue was purified by a silica gel column using ethyl acetate/hexane (1/20, v/v) to afford 0.55 g red oil product and recovered 3.45 g starting material. The yield was 61% based on consumed starting ketone. $^1$H NMR (CDCl$_3$): δ10.13 (d, 8.22 Hz, 1H), 7.33 (d, 8.80 Hz, 2H), 7.15 (d, 15.54 Hz, 1H), 6.77 (d, 16.38 Hz, 1H), 6.68 (d, 9.13 Hz, 2H), 6.20 (d, 7.94 Hz, 1H), 3.78 (t, 5.84 Hz, 4H), 3.55 (t, 5.74 Hz, 4H), 2.68 (s, 2H), 2.52 (br, t, 2H), 2.38 (s, 2H), 1.34 (m, 8H), 1.01 (s, 6H), 0.89 (s, 18H), 0.04 (s, 12H) ppm. $^{13}$C NMR (CDCl$_3$): δ191.53, 157.46, 148.14, 140.57, 133.16, 132.65, 128.23, 124.87, 123.47, 122.31, 111.59, 60.23, 53.43, 40.40, 39.38, 31.59, 30.15, 29.78, 29.52, 28.22, 27.26, 25.79, 22.57, 18.15, 14.03, −5.47 ppm. Exact mass calcd. for $C_{40}H_{69}N_1O_3Si_2$: 668.493. Found: 668.489.

Chromophore

Above aldehyde (0.55 g, 0.823 mmol.) and 2-dicyanomethylene-3-cyano-4,5,5-trimethyl-2,5-dihydrofuran (0.198 g, 0.988 mmol.) were dissolved in 5 mL of ethanol that contained 7 mg of sodium hydroxide. The solution was refluxed for 3.5 hours and then 10 mL of water was added dropwise to precipitate out the product. The crude product was collected by filtration, washed with water, dried in vacuo, and purified by a silica gel column using ethyl acetate/hexane (1/7 to 1/5, v/v) to give 245 mg pure product: yield 35%. $^1$H NMR (CDCl$_3$): δ8.06 (q, $J_1$=12.02 Hz, $J_2$=14.74 Hz, 1H), 7.36 (d, 8.89 Hz, 2H), 7.22 (d, 16.29 Hz, 1H), 6.88 (d, 15.79 Hz, 1H), 6.70 (8.78 Hz, 2H), 6.63 (d, 12.09 Hz, 1H), 6.35 (d, 14.96 Hz, 1H), 3.78 (t, 5.77 Hz, 4H), 3.57 (d, 5.83 Hz, 1H), 2.61 (br, t, 2H), 2.44 (s, 4H), 1.71 (s, 6H), 1.43 (br, m, 8H), 0.89 (s, 18H), 0.03 (s, 12H) ppm. $^{13}$C NMR (CDCl$_3$): δ176.35, 173.46, 155.48, 148.88, 145.13, 144.08, 135.16, 134.78, 128.94, 124.92, 124.27, 122.39, 115.82, 112.80, 112.06, 111.90, 111.77, 96.78, 93.93, 60.40, 55.68, 53.57, 40.87, 40.71, 31.78, 30.64, 30.18, 29.72, 28.43, 27.25, 26.70, 25.97, 22.76, 18.35, 14.24, −5.28 ppm. Exact mass calculated for $C_{51}H_{76}N_4O_3Si_2$: 848.543. Found: 848.546.

In addition to the hexyl variant shown, other linear and branched alkyl derivatives were synthesized and characterized. Also, the methyl groups on the isophorone alicyclic ring were replaced by a variety of longer alkyl groups.

Synthesis of Subclass Ic Chromophore

Figure 6:
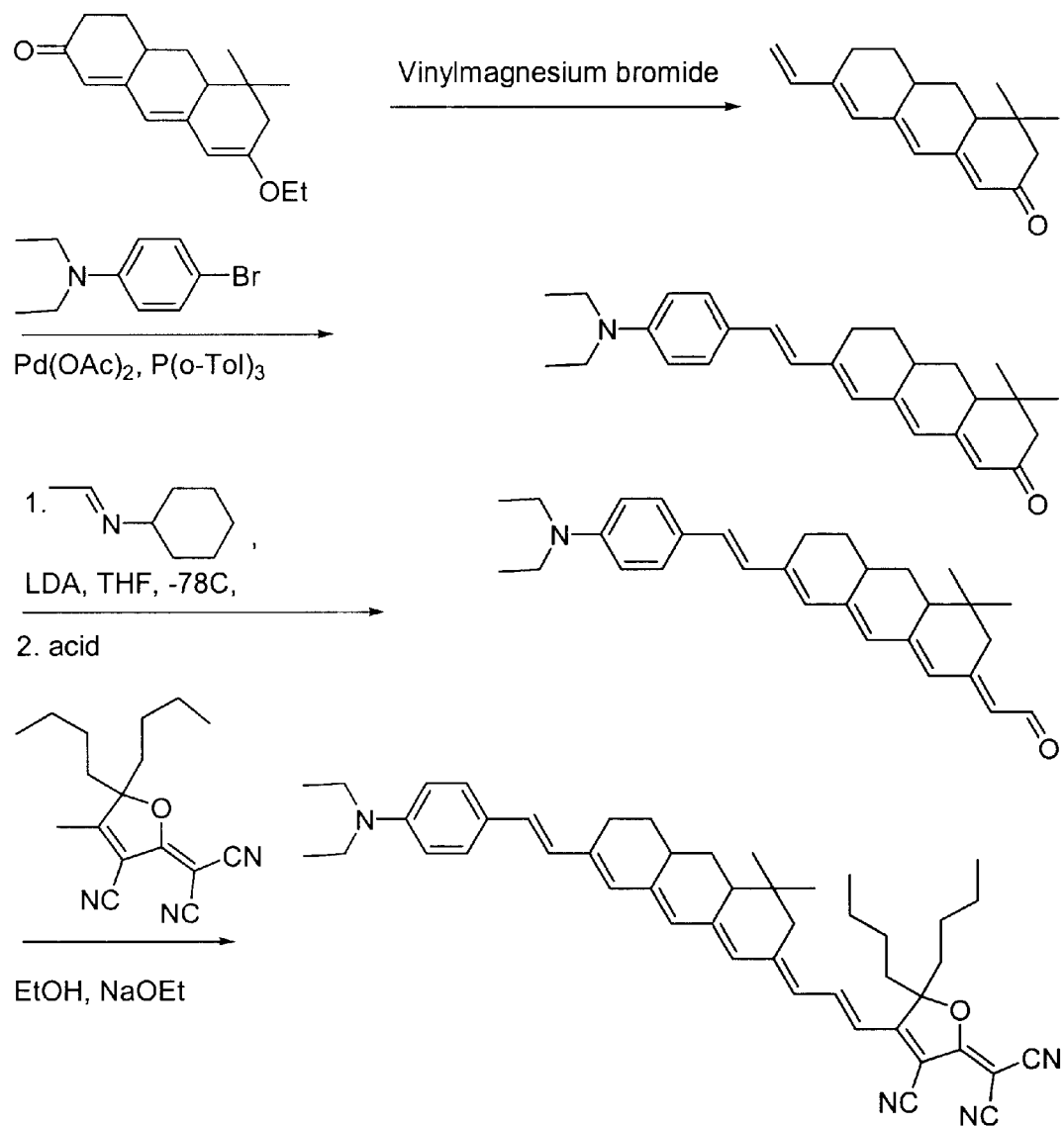
FIG. 6 illustrates an exemplary preferred method for synthesizing a subclass Ic chromophore according to the present invention.

Referring to FIG. 6, an exemplary preferred method for synthesizing the subclass Ic chromophore is illustrated. The exemplary preferred method for synthesis is described below.

The starting material was synthesized according to a literature method [Chem. Mater. 1998, 10, 3284–3286, incorporated herein by reference].

Reaction with vinylmagnesium bromide: 18.235 g, 66.95 mmol of the starting material ethoxytrienone in 50 ml THF was added to 1.2 eq, 80 ml 1M vinylmagnesium bromide. Twenty minutes later, the mixture was stirred in 50° C. water bath which was allowed to cool down naturally. The stirring was continued overnight at RT. After acidification and usual work-up, the crude product was purified by column chromatography to give 12.5 g pure product.

Heck Coupling

Typical reaction condition as described in JOC, 1978, 43, 2941. Carl B. Ziegler et al. (incorporated herein by reference) was followed. The yield was 26%.

Ketone to aldehyde

The method described for the same reaction in the synthesis of a subclass Ia chromophore (see FIG. 3) was used. The typical yield was 50%.

Chromophore

The method described for the same reaction in the synthesis of a subclass Ia chromophore (see FIG. 3) was used. The typical yield was 70%. The product was a mixture of 81% trans and 19% cis isomers. $\lambda_{max}$ is 689 nm in dioxane, and is 750 nm in chloroform. Elemental analysis: calculated for C47H56N40, C 81.46, H 8.15, N 8.09; found: C 81.27, H 8.29, N 8.00.

The synthesis of the subclass Ib chromophores is a subset of that of subclass Ic, and therefore is not detailed here.

Figure 7:
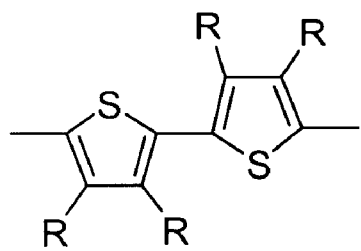
FIG. 7 illustrates the bithiophene unit as a bridge structural unit of NLO chromophores according to the present invention.
Figure 8:
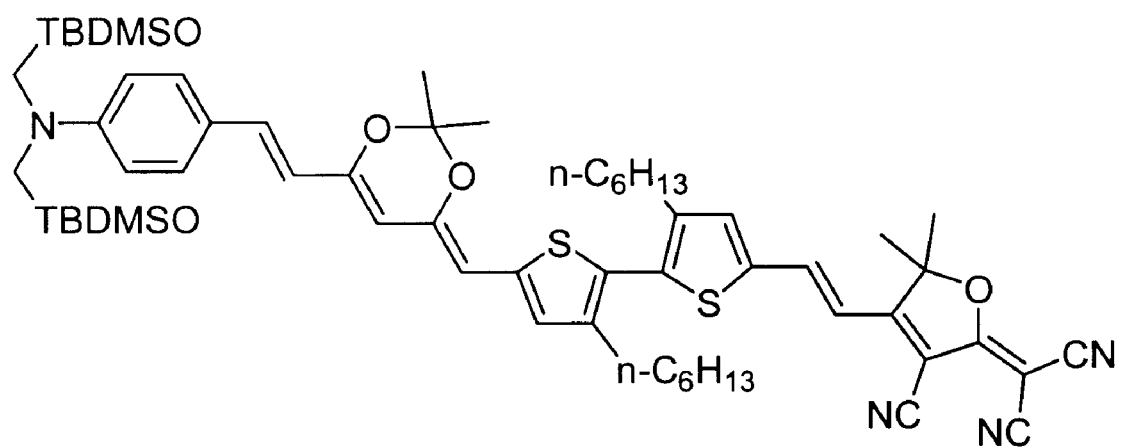
FIG. 8 illustrates a sterically derivatized bithiophene chromophore that gives an electro-optic coefficient of 95 pm/V at 1.06 $\mu$m according to the present invention.

Referring to FIG. 7, the bithiophene structure can also be incorporated into the bridge system as a conjugate unit to form the class II chromophroes according the present invention. It has been observed that much lower electro-optic coefficient ($r_{33}$) values were obtained for chromophores containing underivatized bithiophene unit [See, "Importance of intermolecular interactions in the nonlinear optical properties of poled polymers" by I. Liakatas, C. Cai, M. Bösch, M. Jäger, Ch. Bosshard, and P. Günter (Switzerland), Cheng Zhang, Larry R. Dalton; Applied Physics Letters, 2000, vol 76, no. 11, pp1368–1370, which is incorporated herein by reference]. A dibutyl derivatized bithiophene chromophore (shown in FIG. 8) has been synthesized according to the present invention and it has been observed that this steric modification enhanced its $r_{33}$ value to 95 pm/V at 1.06 μm, making it comparable with that of subclass Ia chromophres. However, it should be noted that bithiophene chromophores generally have red-shifted absorption and therefore may not be particularly suitable for applications at short wavelengths.

Figure 9:
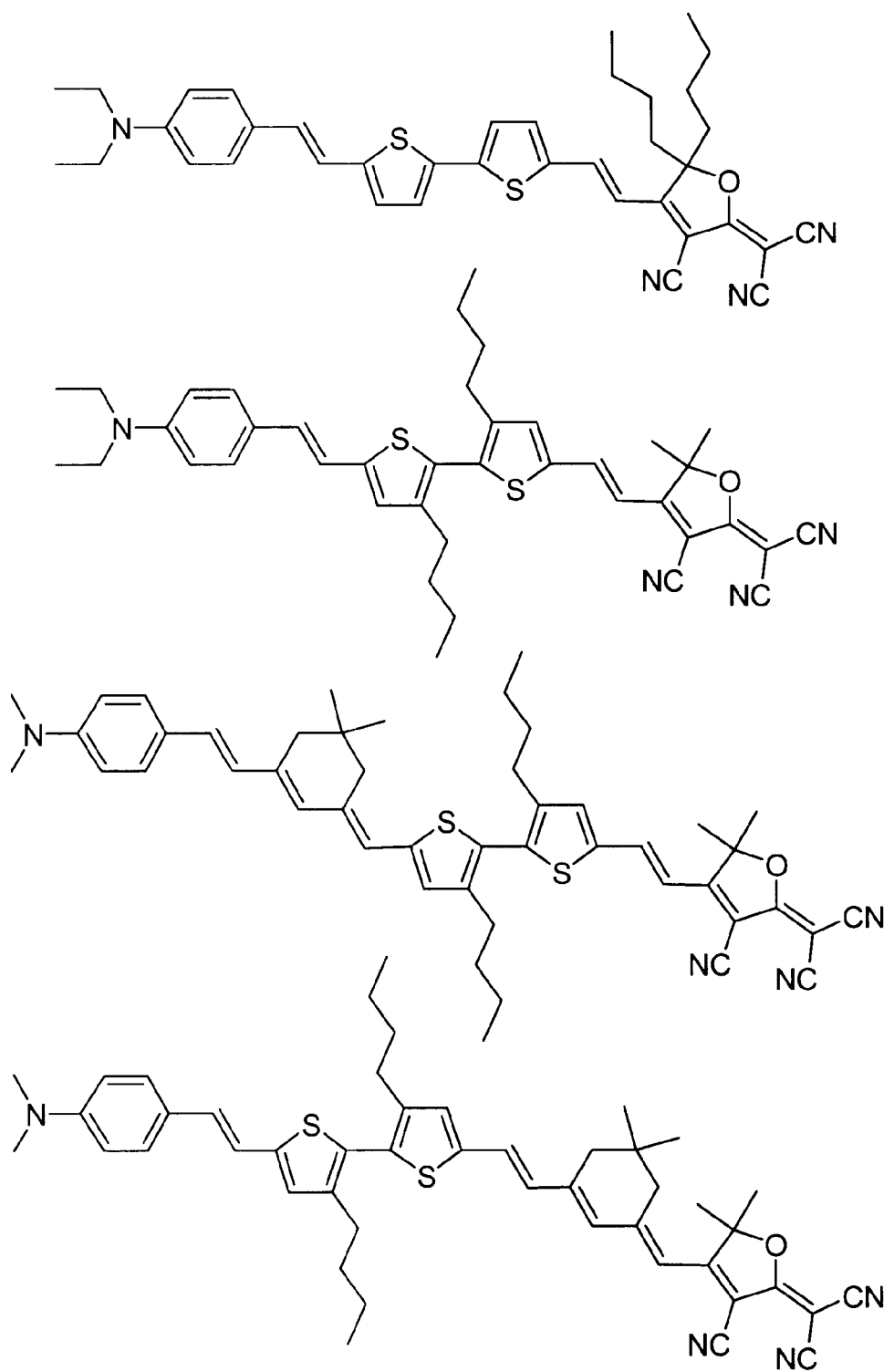
FIG. 9 illustrates some exemplary preferred class II chromophore structures according to the present invention.

Some of the exemplary preferred bithiophene chromophore structures (class II) are shown in FIG. 9. The use of isophorone-derivatized six-membered ring in place of the dimethyldioxine ring (the oxygen-containing six-membered ring in FIG. 8) increases the synthetic yield. The exemplary synthesis of a representative bithiophene chromophore is shown in FIG. 10.

Synthesis of Chromophore Incorporating Bithiophene Units

Figure 10:
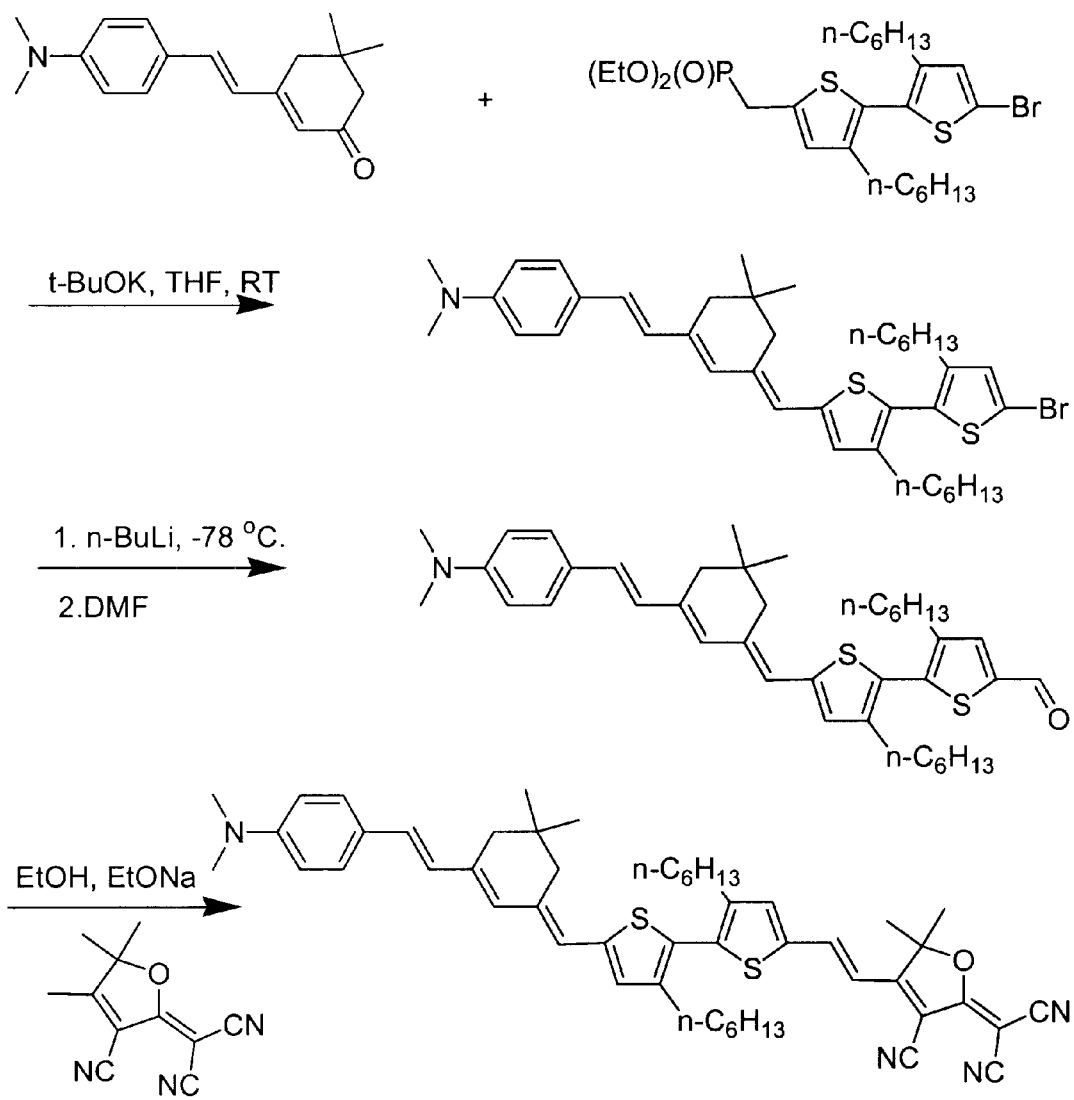
FIG. 10 illustrates an exemplary preferred synthetic method of sterically derivatized bithiophene chromophores (class II) according to the present invention.

Referring to FIG. 10, an exemplary preferred method for synthesizing the chromophore incorporating bithiophene unit is illustrated. The exemplary preferred method for synthesis is described below.

The starting material aminophenylenone is synthesized following the same procedure used for the step 1 of FIG. 3. The typical yield was 80–90%.

The starting material bromobithiophene phosphonate is obtained in five steps from 2,2'-bithiophene:

3,3', 5,5'-Tetrabromo-2,2'-bithiophene

Bromine (41.2 g, 257.8 mmol) was added dropwise to a solution of 2,2'-bithiophene (10 g, 60.2 mol) in 250 ml of chloroform at 0–5° C. A light-yellow solid was formed gradually during the addition. The mixture was stirred at room temperature overnight and then refluxed for 2 h. After cooling to room temperature, 100 ml of 10% KOH aqueous solution was added. The resulting mixture was extracted with chloroform to give the crude product. Recrystallization from ethanol/CHCl$_3$ (1:1) afforded a light-yellow crystal in the yield of 87% (25.1 g). $^1$H-NMR (CDCl$_3$, ppm) δ7.05 (s, 2H).

3,3'-Dibromo-2,2'-bithiophene

A mixture of 3,3', 5,5'-tetrabromo-2,2'-bithiophene (25 g, 52.3 mmol), ethanol (50 ml), water (50 ml) and glacial acetic acid (100 ml) was heated to reflux. Then the heating oil bath was removed, and zinc powder (13.1 g, 200 mmol) was added in portions at such a rate that the mixture continued to reflux. After the addition was complete, heating was continued, the mixture was refluxed for another 5 h and cooled down to room temperature. The unreacted zinc powder was filtered off and the filtrate was collected, diluted with diethyl ether and then washed twice with water. The ether solution was dried with anhydrous MgSO$_4$ and the solvent was evaporated under reduced pressure. The crude product was recrystallized from hexane to afford a greenish crystal in the yield of 91% (15.3 g). $^1$H-NMR (CDCl$_3$, ppm): δ7.40 (d, 2H, J=5 Hz), 7.11 (d, 2H, J=5 Hz). 3,3'-Dihexyl-2,2'-bithiophene. Hexylmagnesium bromide (100 ml, 2 M solution in diethyl ether, 200 mol) was added dropwise to a solution of 3,3'-dibromo-2,2'-bithiophene (15 g, 46.6 mmol) and Ni(dppp)Cl$_2$ (0.5 g, 0.1 mmol) in 100 ml of diethyl ether at 0° C. The reaction was slightly exothermic and a red brown coloration was observed. After being stirred and heated for 24 h, the reaction mixture was cautiously poured into a mixture of crushed ice and diluted HCl solution and extracted with ether. The combined extracts were dried over anhydrous MgSO$_4$ and filtered. After removal of the solvent, the residue was vacuum-distilled to give a clear viscous oil (15.6 g, 81%). $^1$H-NMR (CDCl$_3$, ppm) : δ7.25 (d, 2H, J=5 Hz), 6.96 (d, 2H, J=5 Hz), 2.50 (t, 4H), 1.54 (m, 4H), 1.23 (m, 12H), 0.85 (t, 6H).

5-(3,3'-Dihexyl-2,2'-bithienyl)methylphosphonate

A solution of 3,3'-dihexyl-2,2'-bithiophene (8 g, 24 mmol) in 80 ml of anhydrous THF was added over 45 min under argon at −78° C. to a stirred solution of n-butyllithium (9.6 ml, 2.5 M in hexanes, 24 mmol) in 150 ml of THF. The solution was stirred for 45 min at −78° C., and then transferred, via cannula, into a flask cooled to −20° C. in a dry ice/CCl$_4$ bath, containing CuI (4.6 g, 24 mmol). After 2 h, diethyl iodomethylphosphonate (6.7 g, 24 mmol) was added in one portion, and the solution was reacted at room temperature overnight. The dark reaction mixture was poured into 300 ml of ether and 200 ml of water, and the organic layer washed successively with 3×200 ml water, 1×200 ml 5% aqueous NaHCO$_3$, 2×200 ml water, and 2×200 ml saturated brine solution. The organic layer was dried (MgSO$_4$), and evaporated. The resulting residue was purified by column chromatography packed with silica gel (1:1 hexanes: ethyl acetate), affording a clear yellow viscous oil (7.2 g, 62%). $^1$H-NMR (CDCl$_3$, ppm) : δ7.26 (d, 1H, J=5 Hz), 6.96 (d, 1H, J=5 Hz), 6.88 (d, 1H, J=3.2 Hz), 4.12 (m, 4H), 3.34 (d, 2H, J=20.5Hz), 2.47 (m, 4H), 1.52 (m, 4H), 1.31 (t, 6H), 1.24 (m, 12H), 0.86 (t, 6H).

5-(5'-Bromo-3,3'-dihexyl-2,2'-bithienyl)methylphosphonate

A solution of 5-(3,3'-dihexyl-2,2'-bithienyl) methylphosphonate (7 g, 14.5 mmol) and NBS (2.8 g, 15.7 mmol) in 150 ml of dichloromethane was stirred at 0° C. for 1 h and at room temperature for 2 h. Then the mixture was washed with 100 ml of 10% KOH aqueous solution and then with water until the solution was neutral. The organic layer was concentrated to give the crude product (7.8 g, 96%). $^1$H-NMR (CDCl$_3$, ppm) : δ6.90 (s, 1H), 6.84 (d, 1H, J=5 Hz), 4.10 (m, 4H), 3.30 (d, 2H, J=20.5Hz), 2.43 (m, 4H), 1.50 (m, 4H), 1.29 (t, 6H), 1.22 (m, 12H), 0.85 (t, 6H).

The coupling of the aminophenyldienone and the bromothiophene phosphonate (starting materials in FIG. 10) was effected with typical Wittig-Honor condition (t-BuOK as base, THF as solvent). The yield of product was around 20%. The conversion of the resulting bromide to the corresponding aldehyde was performed by the lithiation of the bromide and the subsequent DMF treatment under usual condition. The yield is generally high (>80%). The coupling of the resulting aldehyde with acceptor TCF followed the procedure described above for the synthesis of the subclass Ia chromophore shown in FIG. 3. The yield was 75%.

Several exemplary preferred ring-locked tricyano electron acceptor groups are illustrated in FIG. 11. In FIG. 11, R=H, F, or any perhalogenated, halogenated or non-halogenated aliphatic or aromatic group with 1–30 carbon atoms functionalized with zero or more of functional groups: hydroxy, ether, ester, amino, silyl, and siloxy, and R groups at different positions are not necessarily the same.

The five-membered ring-locked tricyano acceptor (cyanofuran acceptor, TCF in FIG. 11) has been modified to further increase electro-optic activity and chromophore stability. According the present invention, a large number of atoms and organic groups (e.g., carbonyl) have been used in place of the furan oxygen in the electron acceptor group leading to improved electron withdrawing ability. Six-membered ring-locked analogs (TCP) have also been developed. The oxygen atom of the furan ring and the pyran ring (in TCF and TCP) is replaced by a methylene moiety to produce the desired effect of blue shifting the optical absorption spectrum leading to lower optical loss for some electro-optic applications.

Figure 12:
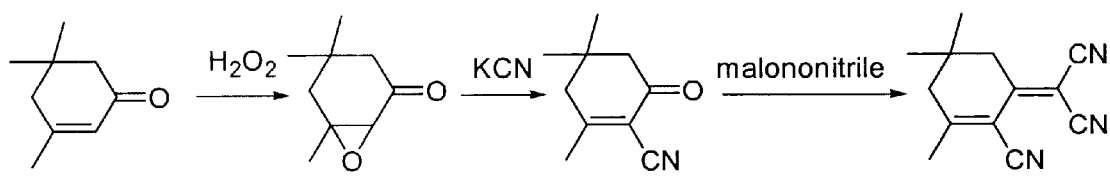
FIG. 12 illustrates an exemplary preferred synthetic scheme of a ring-locked tricyano acceptor TCI according to the present invention.

Referring to FIG. 12, a subclass Ia chromophore is shown where the cyanofuran acceptor has been replaced by an isophorone derivatized tricyano acceptor (denoted as TCI. This has the desired effect of blue shifting the optical absorption spectrum leading to lower optical loss for some electro-optic applications.

Synthesis of Chromophore With Isophorone Structure in Electron Acceptor Group

Synthesis of the acceptor TCI (FIG. 12)

To a mixture of isophorone (400 g), EtOH (1000 ml), NaOH (20 g) and water (30 ml) was added 1.2eq, 3.473 mol, 394.76 g of 30% H$_2$O$_2$ in portions at RT. After 4 hour of stirring, the mixture was neutralized with dilute acetic acid and extracted with diethyl ether. The extract was dried over MgSO4, condensed via rotary evaporation. The crude product was used in the next reaction without purification.

To a solution of the above crude product in 500 ml EtOH was added a solution of 2.89 mol, 108 g KCN/ 150 g water in portions over 0.5 h. The mixture was refluxed for 1 h. Rotovap at 60° C. to remove EtOH. The residue was neutralized with 6N hydrochlorix acid. The product was collected by filtration. The crude product was purified with column chromatography using 4/1 hexanes/EtOAc as eluent to give 180 g pure product.

TCI (2-cyano-3-dicyanomethylene-1,5,5-dimethylcyclohexene)

A mixture of 2-cyanoisophorone(14.19 g, 86.9 mmol), malononitrile (6.89 g), EtOH (15 ml) and EtONa (100 mmol, 6.88 g) was heated in 80–90° C. bath for 1 h. The mixture was poured water, neutralized with acetic acid and extracted with ethyl acetate. The extract was condensed and purified with silica gel column chromatography. Recrystallization of the product from EtOAc/hexane gave gray crystals with mp of 103.5–105.5. Elemental analysis: calcd. C 73.91, H 6.20, N 19.89; found C 73.93, H 6.26, N 19.97.

Figure 13:
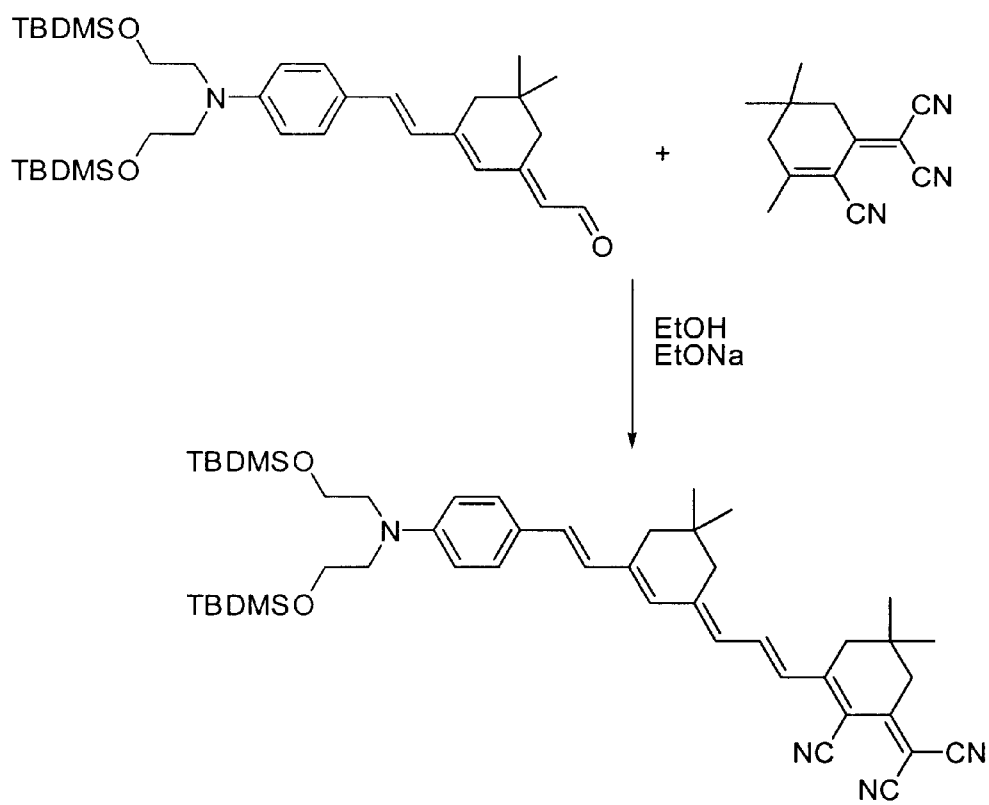
FIG. 13 illustrates an exemplary preferred synthetic scheme of a single-ring locked subclass Ia chromophore with the acceptor TCI according to the present invention.

Synthesis of the chromophore (FIG. 13): the TCI-based chromophore was synthesized in a manner similar to the synthesis of chromophore in FIG. 3. UV-vis aborption: 630 nm in dioxane, 680 nm in chloroform.

Referring to FIG. 14, alternative donor structures for the class I and class II chromophores and chromophores derived from the tricyano acceptors (shown in FIG. 11) are illustrated. It has been observed that chromophores have been systematically improved by the utilization of the new donor structures which provide improved electro-optic activity as the result of an improved inductive (electron donating) effect and through better overlap of π-electron orbitals due to steric and resonance effects. In FIG. 14, R=H, F, or any perhalogenated, halogenated or non-halogenated aliphatic or aromatic group with 1–30 carbon atoms functionalized with zero or more of functional groups: hydroxy, ether, ester, amino, silyl, and siloxy, and R groups at different positions are not necessarily the same.

According to the present invention, various chromophores have been incorporated into host polymer poly[bisphenol A carbonate-co-4,4'-(3,3,5-trimethylcyclohexylidene)diphenol carbonate] which is available from Sigma-Aldrich Chemical Company. Excellent thermal and optical properties have been observed in devices. Good electric field poling efficiency and low optical loss of 1.7 dB/cm have been obtained consistently in Mach-Zehnder modulators. Dynamic stability of 120° C. and long term stability at 60° C. have been also observed. See, *Practical Electro-Optic Polymer Modulators using PC/CLD*. Min-Cheol Oh, Hua Zhang, Attila Szep, Vadim Chuyanov, William H. Steier, Cheng Zhang, Larry R. Dalton. Applied Physics Letters. 2000, in press, which is incorporated herein by reference.

The organic chromophores of the present invention exhibit exceptional molecular optical nonlinearity, thermal stability, and low optical absorption at communication wavelengths. The chromophore materials of the present invention are suitable for processing into hardened polymers for electro-optic devices employing protocols previously developed for other chromophores. The materials are fully amenable to all processing steps necessary for the fabrication of such devices.

Figure 17:
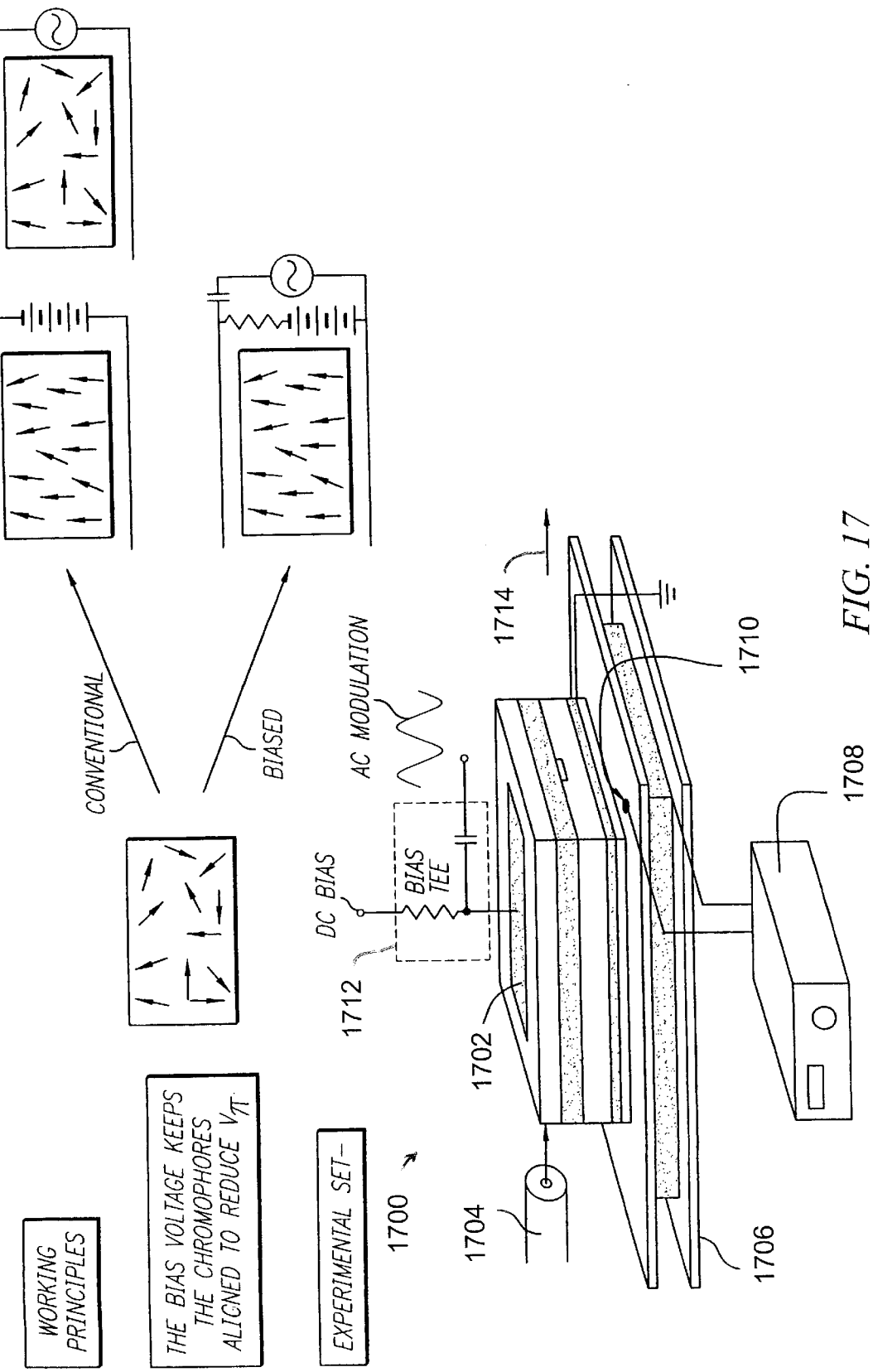
FIG. 17 illustrates an exemplary preferred electro-optic device employing a constant electric field bias, the device incorporating a chromophore material the present invention.

According to the present invention, these materials can be employed not only in conventional electro-optic modulator device configurations but also in devices employing a constant bias field which permits the full potential of the materials to be demonstrated. Referring to FIG. 17, an exemplary preferred electro-optic device 1700 employing a constant electric field bias is illustrated. The illustrated electro-optic device 1700 includes a modulator chip 1702, a fiber 1704, a thermoelectric cooler 1706, a temperature controller 1708, a thermister 1710, and a bias tee 1712 (including a resistor and a capacitor) configured as shown providing a light output indicated by arrow 1714.

Figure 18:
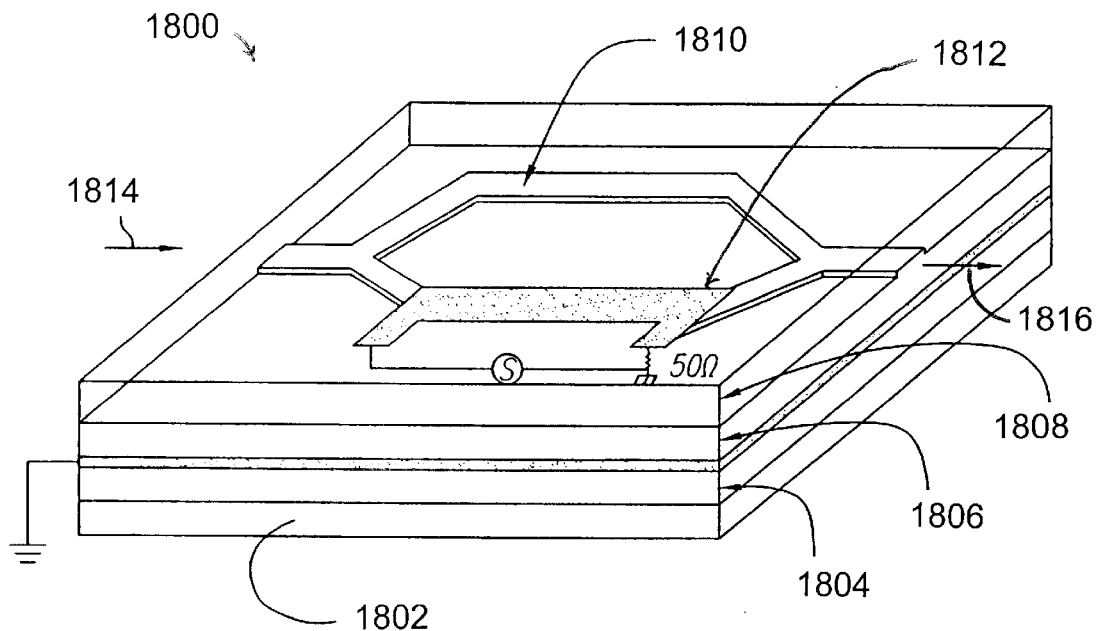
FIG. 18 illustrates an exemplary preferred Mach Zehnder modulator incorporating a chromophore material of the present invention.

Referring to FIG. 18, an exemplary preferred Mach Zehnder modulator 1800 incorporating a chromophore material of the present invention is illustrated. The illustrated modulator 1800 includes a Si substrate 1802, an Epoxylite (3 μm) layer 1804, a PU-chromophore (1.5 μm) layer 1806, a NOA73 (3.5 μm) layer 1808, a waveguide 1810 and an electrode 1812 configured as shown with light indicated by arrows 1814, 1816.

Figure 19:
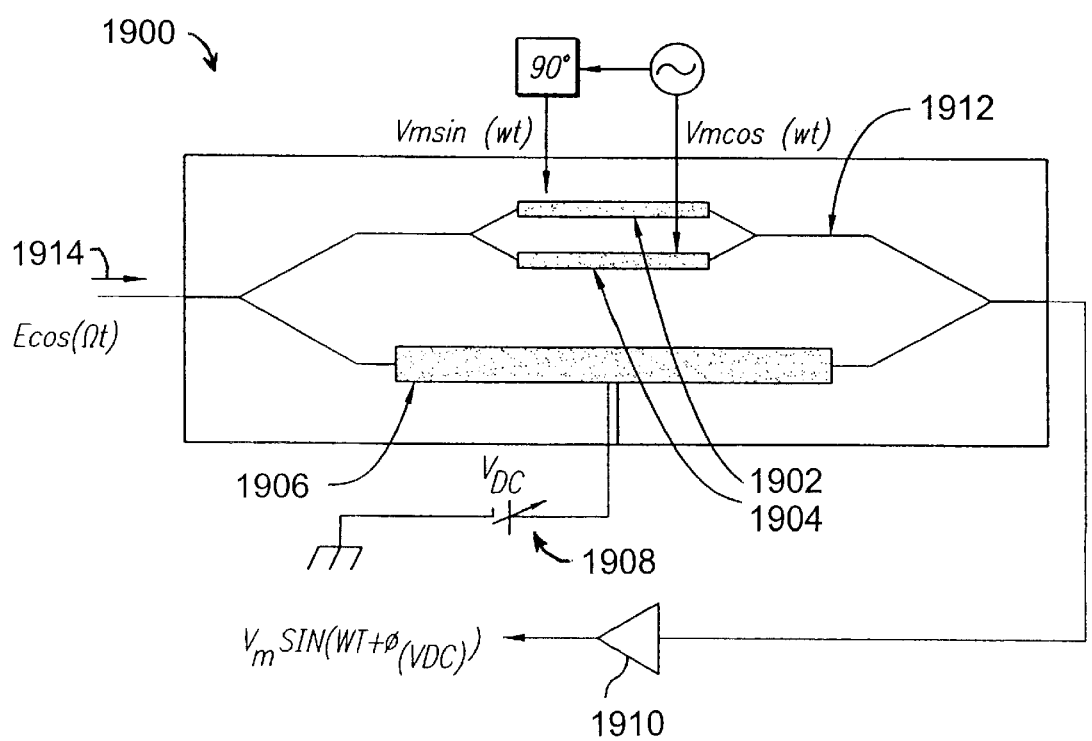
FIG. 19 illustrates the use of a chromophore material of the present invention (in the form of microstrip lines) in a microwave phase shifter of the type employed in optically controlled phased array radars.

Referring to FIG. 19, the materials of the present invention are shown in the form of microstrip lines in an exemplary preferred microwave phase shifter 1900 of the type employed in optically controlled phase array radars. The illustrated microwave phase shifter 1900 includes microstrip lines 1902, 1904, a DC control electrode 1906, a DC source 1908, a photodetector 1910 and an optical waveguide 1912 configured as shown with light indicated by arrow 1914.

Figure 20:
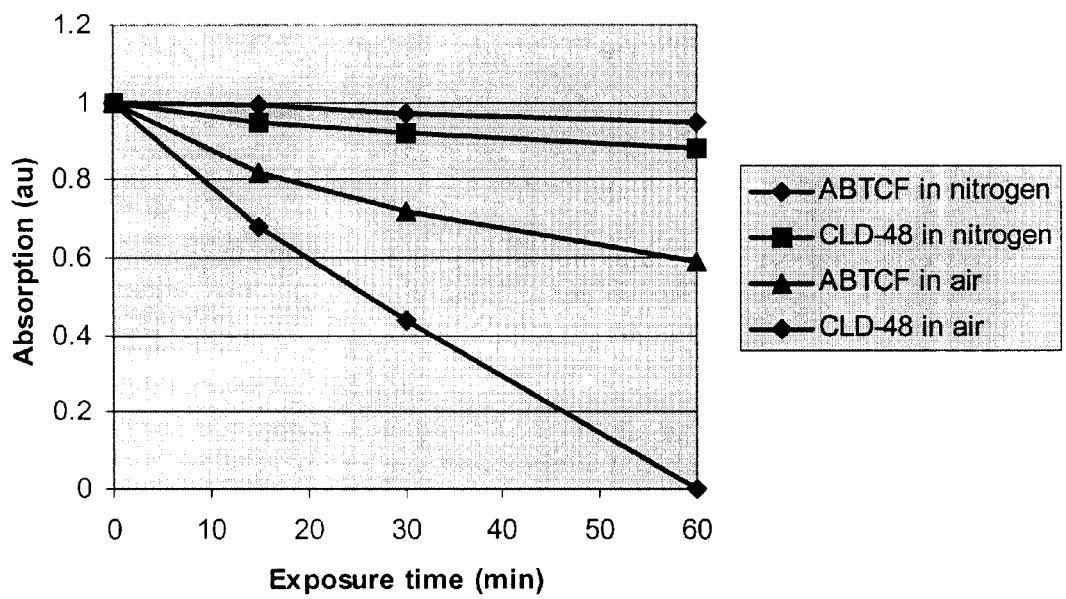
FIG. 20 illustrates the observed photostability of two chromophores (ABTCF, CLD-48) measured by UV flood light experiment and illustrates the structures of the two chromophores studied.
Figure 20:
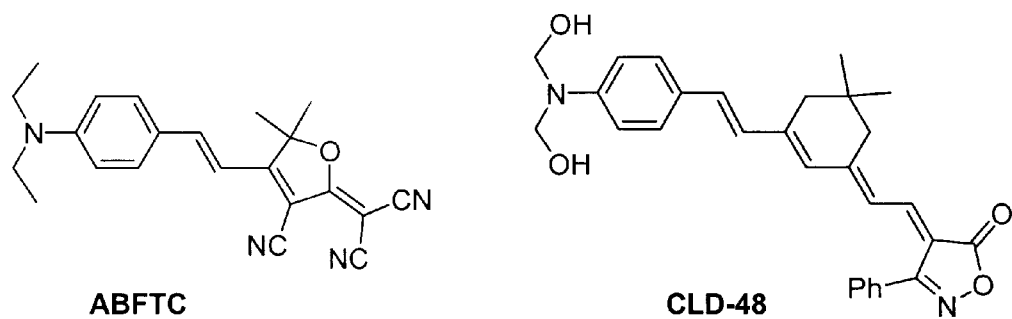

Referring to FIG. 20, the observed photostability of two chromophores (ABTCF, CLD-48) measured by UV flood light experiment are shown. Polymer films (5 wt % in PMMA) were flood exposed with broadband UV-light of constant intensity. Absorbance changes in lmax were monitored as a function of exposure time using a UV-vis spectrometer for samples exposed in ambiant and nitrogen-purged environment.

The structures of the two chromophore studied are also shown in FIG. 20. The chromphore CLD-48 has a longer conjugate bridge than that of the chromophore ABTCF (four double bonds versus only one double bond), and also has a weak acceptor. ABTCF has better stability than CLD-48. This phenomenon is attributed to the different electron density on the nitrogen donor. In ABTCF, the strong tricyano electron acceptor and shorter bridge causes a larger extent of charge transfer from electron rich amino donor to the electron deficient tricyano acceptor in both ground and excited states. Nevertheless, even the more stable ABTCF undergoes fast decomposition in air.

As shown in FIG. 20, the stabilities of both chromophores increased significantly in the nitrogen environment; and a much larger improvement was observed for CLD-48. This preliminary study in the UV region indicates that photoinduced oxidation is the dominant degradation mechanism in air, and the stability of longer chromophore can be comparable to the stability of shorter ones with a stronger acceptor.

Figure 21:
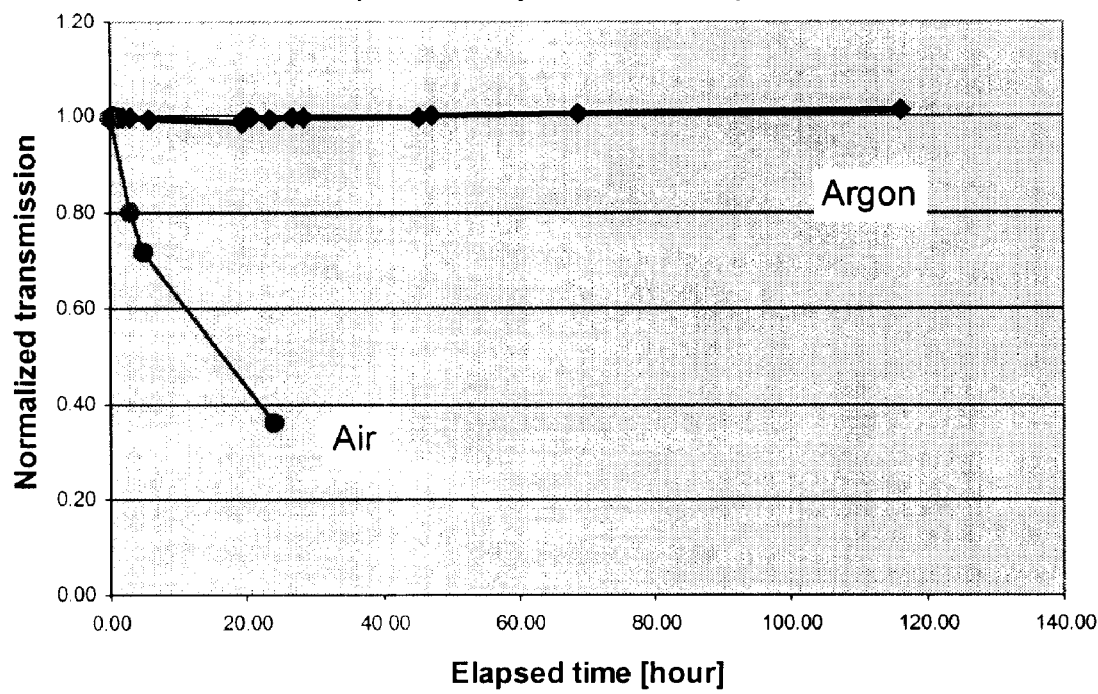
FIG. 21 illustrates the observed photostability of electrically poled CLD-1/APC in ridge waveguide and illustrates the structure of the chromophore CLD-1.
Figure 21:
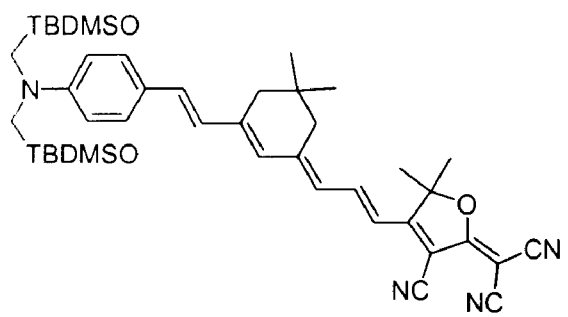

The photostability of a device quality chromophore CLD-1 was also tested. Referring to FIG. 21, the chemical structure of a high μβ chromophore CLD-1 and the observed photostability of electrically poled CLD-1/APC in ridge waveguide are shown. (The synthesis of CLD-1 has been disclosed in the aforementioned parent U.S. patent application.)

Figure 16:
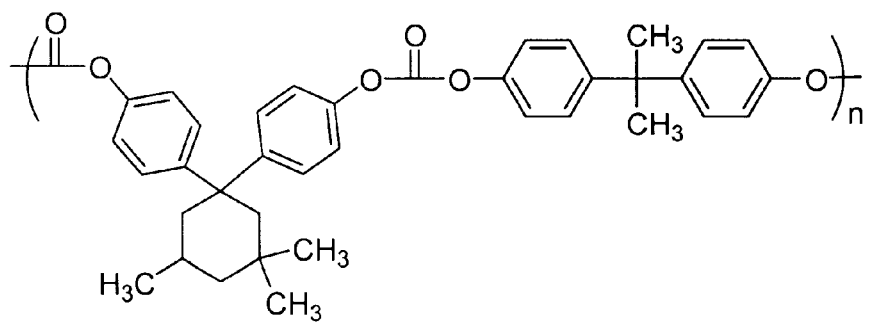
FIG. 16 illustrates the structure of poly [bisphenol A carbonate-co-4,4'-(3,3, 5-trimethylcyclohexylidene) diphenol carbonate] according to the present invention.
Figure 22:
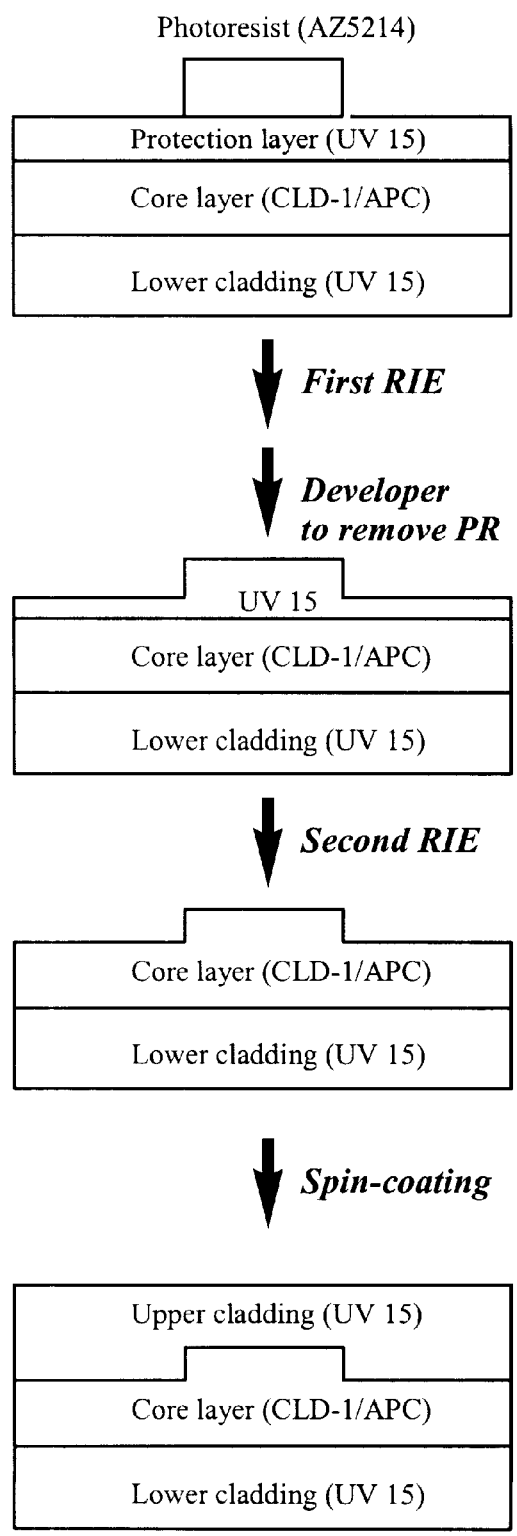
FIG. 22 illustrates two-step REI of CLD-1/APC polymer waveguide fabrication according to the present invention.

The CDL-1 was doped in the Aldrich polycarbonate (denoted as APC, structure shown in FIG. 16) at 25 wt % concentration. A waveguide was fabricated from CLD-1/APC (as core layer) and UV-15 uv-curable polymer (as cladding layer) using a two-step REI of CLD-1/APC polymer waveguide fabrication with protection layer process shown in FIG. 22. For the detailed fabrication procedure, see Practical Electro-Optic Polymer Modulator using PC/CLD, by Min-Cheol Oh, Hua Zhang, Attila Szep, Vadim, William H. Steier, Cheng Zhang, Larry R. Dalton, Applied Physics Letters, 2000, in press.

The input optical fiber was butt-coupled to the CLD-1/APC polymer waveguide. The waveguide was sealed in a transparent box (container) which was flushed with argon for 24 hours before the input laser was turned on. A 10 mw 1550 nm laser beam from a stable semiconductor laser was used as the input. The argon flow was continued during the entire test. The output laser was collected by a lens and analyzed by a power meter. The same test was also done in air. Referring again to FIG. 21, in air, the waveguide transmission dropped immediately once the test was started, and after 25 hours, the output power dropped by 64%. In argon, no significant change was observed over 5 days. The loss of optical transmission is due to the decrease of material index in the waveguide, which causes the gradual loss of laser mode confinement. The decrease of material index is a result of photoinduced oxidation by oxygen in the air. In the air test, the loss of confinement was confirmed by the mode shape of the output beam. At the end of the air test, the waveguide completely lost its waveguiding ability, and the laser beam was mostly diffused into the neighboring region of the waveguide. These results indicate that the CLD chromophore does not survive operation in air, but can survive for very long time when oxygen is replaced by argon (or other inert gas). These results demonstrate that the chromophores of the present invention are highly suitable for application in commercial devices.

Figure 23:
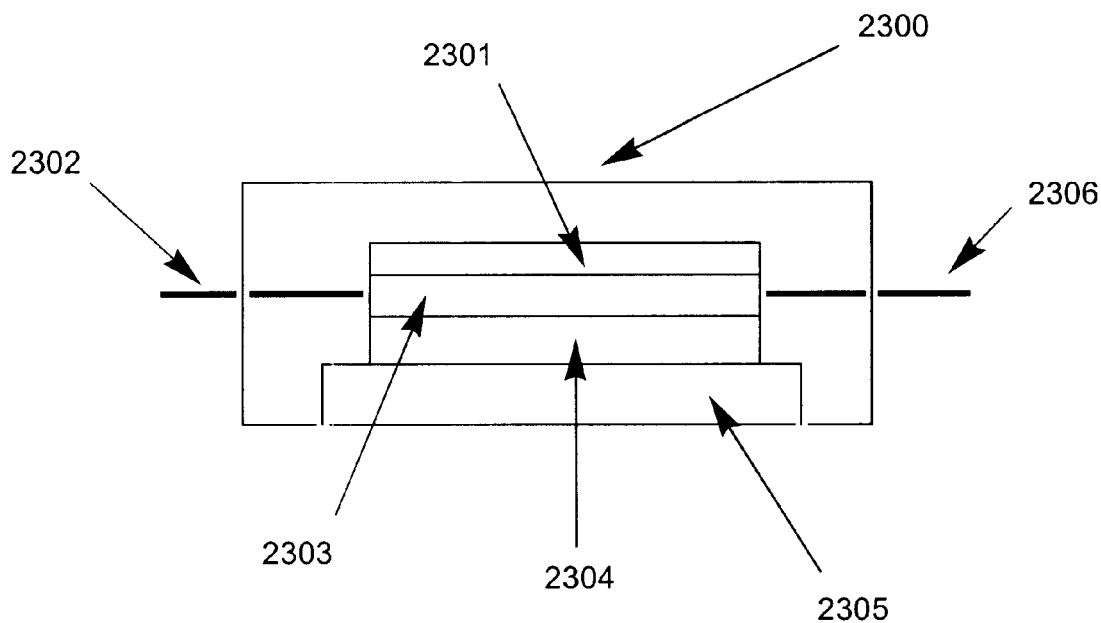
FIG. 23 illustrates an electro-optic device hermetically packaged within a container according to the present invention.

Referring to FIG. 23, an electro-optic device is shown hermetically packaged within a container 2300 according to the present invention. The electro-optic device includes an upper cladding 2301, an input fiber 2302, a waveguide 2303, a lower cladding 2304, a substrate 2305 and an output fiber 2306 configured as shown with the container 2300 positioned thereabout. For the sake of clarity, electrodes and other conventional structures are not shown. In an exemplary preferred embodiment, the electro-optic device is hermetically packaged in a gas-tight container 2300 (e.g., a metal casing) which is vacuumed or, alternatively, vacuumed and then filled with an inert gas including one or more of: nitrogen, helium, neon, argon, krypton and xenon. The principles of the present invention are applicable to any polymeric electro-optic device which operates in an (artifically created) oxygen-free environment.

Figure 24:
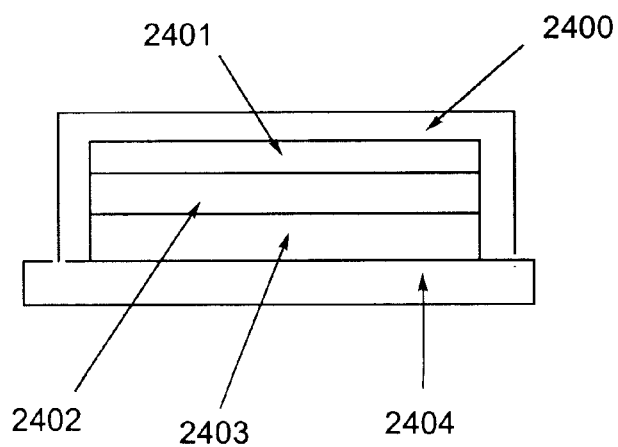
FIG. 24 illustrates an electro-optic device hermetically sealed with a protective coating according to the present invention.

Referring to FIG. 24, an electro-optic device is shown hermetically sealed with a protective coating 2400 according to the present invention. The electro-optic device includes an upper cladding 2401, a waveguide 2402, a lower cladding 2403 and a substrate 2404 configured as shown with the protective coating 2400 positioned thereabout. For the sake of clarity, electrodes and other conventional structures are not shown. The protective coating 240 comprises a material with a low oxygen permeativity which prevents oxygen from entering into the device environment. In an exemplary preferred embodiment, the electro-optic device is hermetically sealed with a UV curable polymer such as UV-15 or epoxy polymer. The principles of the present invention are applicable to sealing polymeric electro-optic devices with any coating material which has a sufficiently low oxygen permeativity to prevent oxygen from entering into the device environment Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:
1. An nonlinear optical device comprising:
an active element including a chromophore formed as

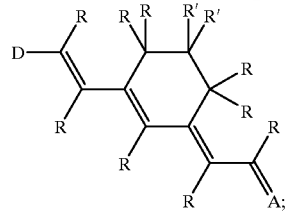

wherein D is an electron donor group;
wherein A is an electron acceptor group;
wherein a conjugate diene in the bridge structure connects the bridge ring structure and the acceptor A;
wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;
wherein R'=H, F, or any perhalogenated, halogenated or non-halogenated aliphatic or aromatic group, with 1–30 carbon atoms functionalized with zero or more of the following functional groups: hydroxy, ether, ester, amino, silyl, and siloxy, and R' is not methyl when the two R' groups are the same.
2. The nonlinear optical device of claim 1 wherein the electron acceptor group is formed as:

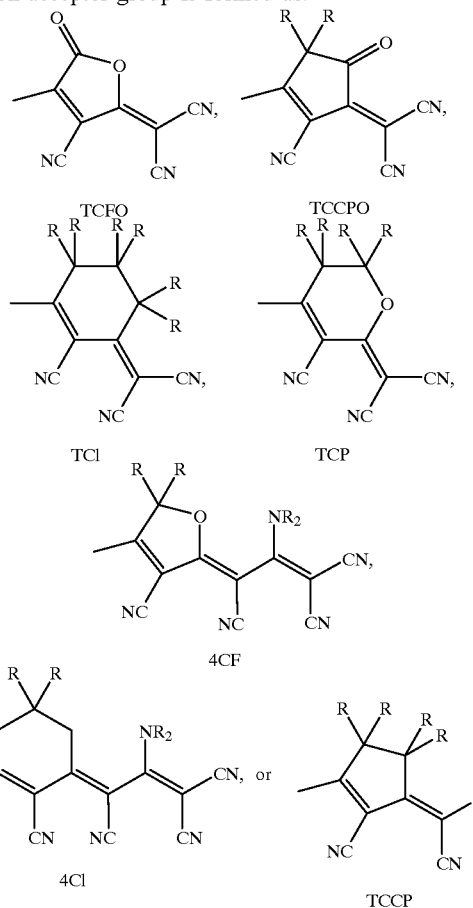

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.
3. The nonlinear optical device of claim 1 wherein the electron acceptor group A is formed as:

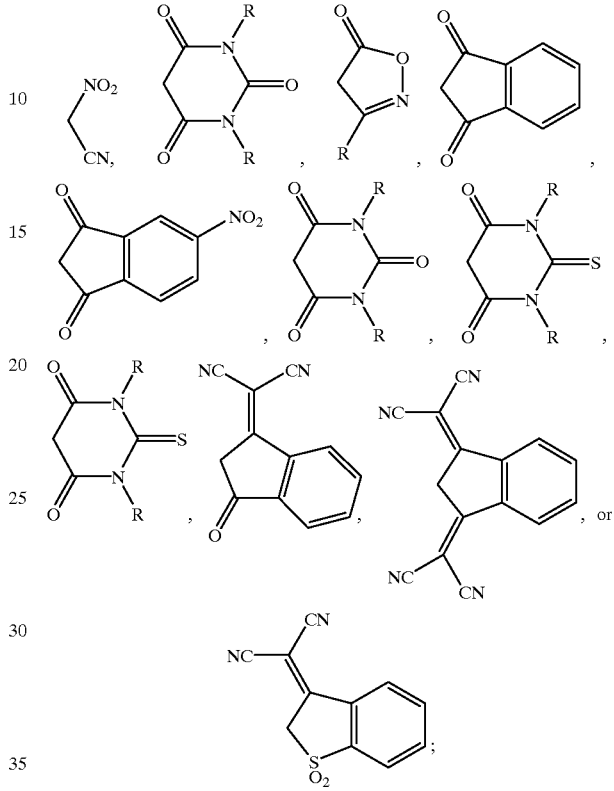

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.
4. A nonlinear optical device comprising:
an active element including a chromophore formed as

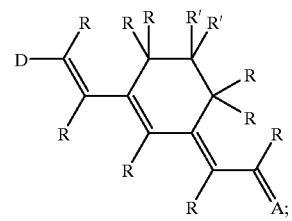

wherein D is an electron donor group;
wherein A is an electron acceptor group;
wherein a conjugate diene in the bridge structure connects the bridge ring structure and the acceptor A;
wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;
wherein R'=methyl group;

wherein the acceptor is formed as

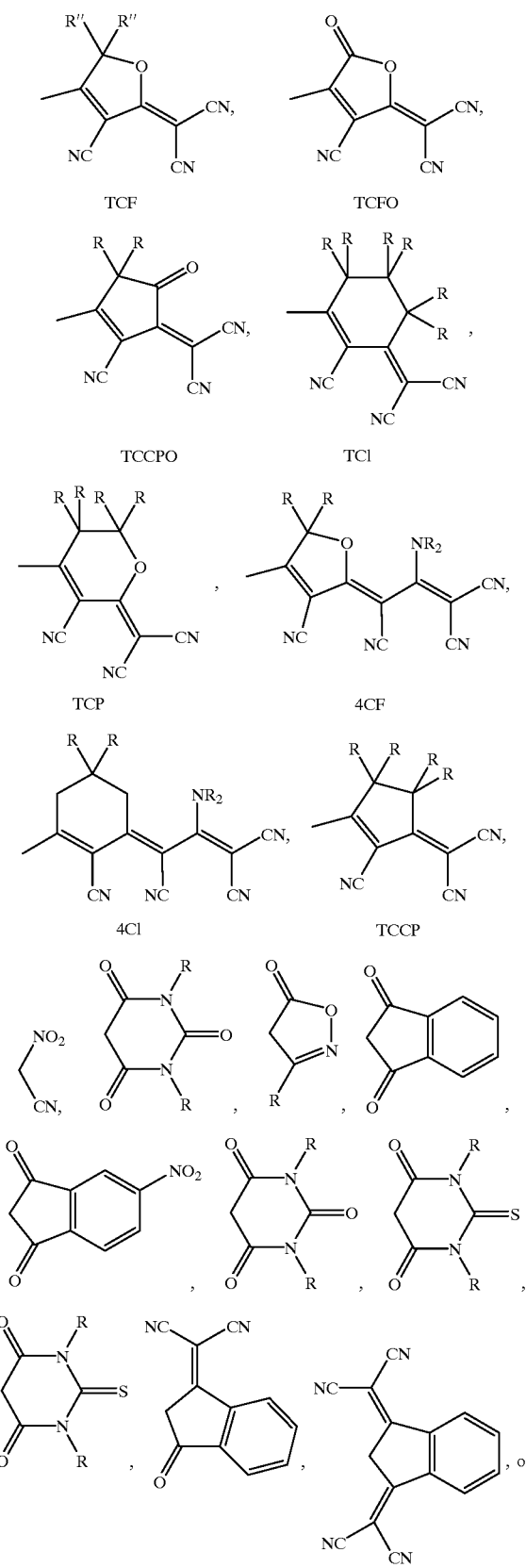

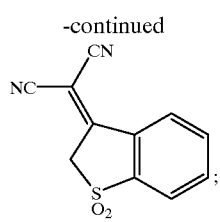

-continued wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;

wherein R"=H, F, or any perhalogenated, halogenated or non-halogenated aliphatic or aromatic group, with 1–30 carbon atoms functionalized with zero or more of the following functional groups: hydroxy, ether, ester, amino, silyl, and siloxy, and R' is not methyl when the two R' groups are the same.

5. A nonlinear optical device comprising:
an active element including a chromophore formed as:

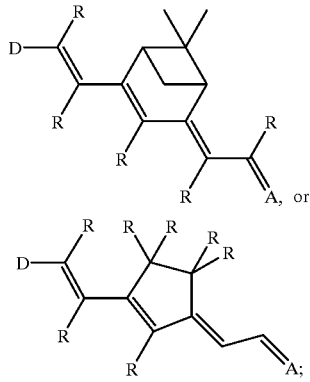

wherein D is an electron donor group;
wherein A is an electron acceptor group;
wherein a conjugate diene in the bridge structure connects the bridge ring structure and the acceptor A;
wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

6. The nonlinear optical device of claim 5 wherein the electron acceptor group is formed as:

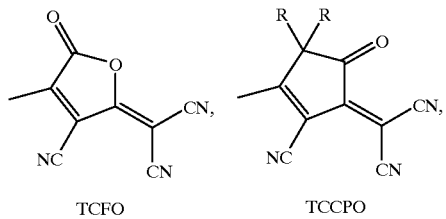

-continued

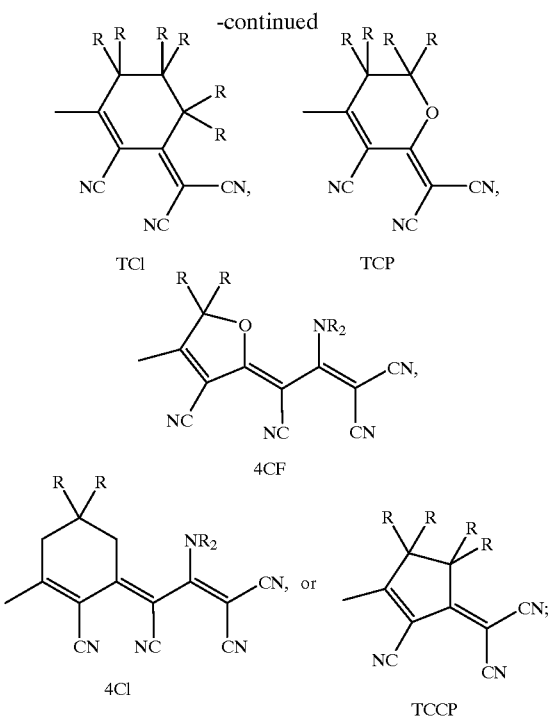

TCl  TCP

4CF

4Cl  TCCP wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

7. The nonlinear optical device of claim 5 wherein the electron acceptor group A is formed as:

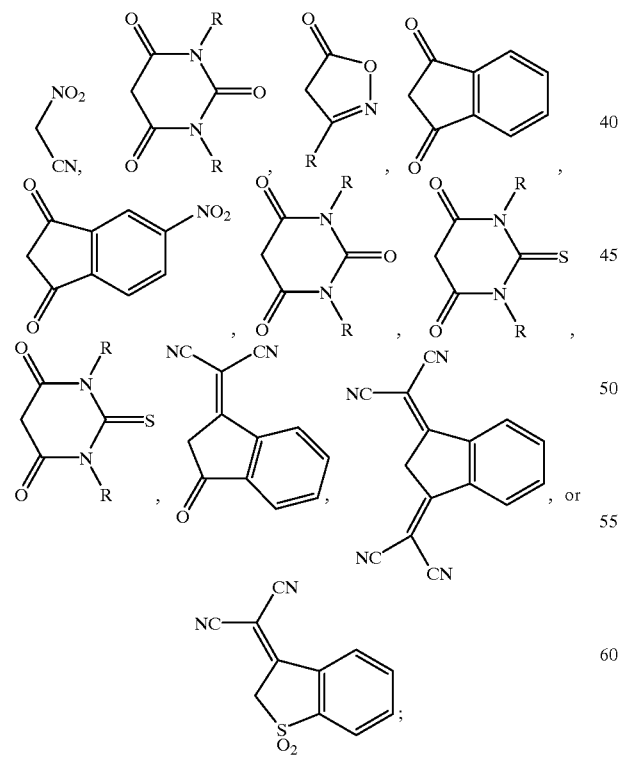

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

8. A nonlinear optical device comprising:

an active element including a chromophore formed as

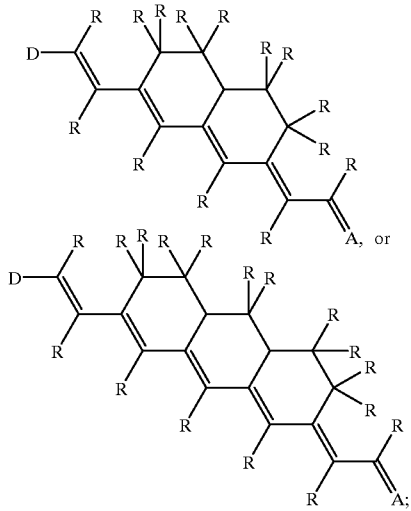

wherein D is an electron donor group;

wherein A is an electron acceptor group;

wherein R=H, F, or any perhalogenated, halogenated or non-halogenated aliphatic or aromatic group with 1–30 carbon atoms functionalized with zero or more of functional groups: hydroxy, ether, ester, amino, silyl, and siloxy, and R groups at different positions are not necessarily the same.

9. The nonlinear optical device of claim 8 wherein the electron acceptor group is formed as:

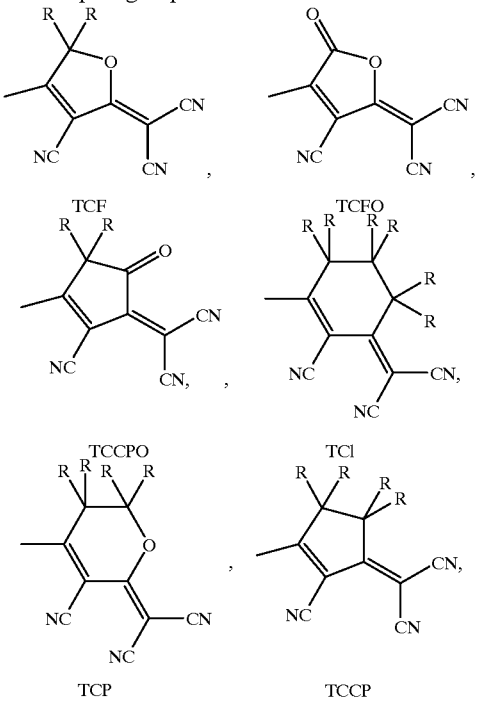

TCF  TCFO

TCCPO  TCl

TCP  TCCP

-continued

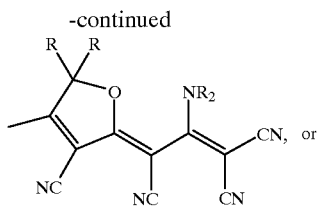

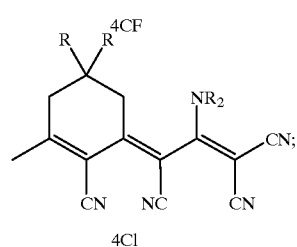

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

10. The nonlinear optical device of claim 8 wherein the electron acceptor group A is formed as:

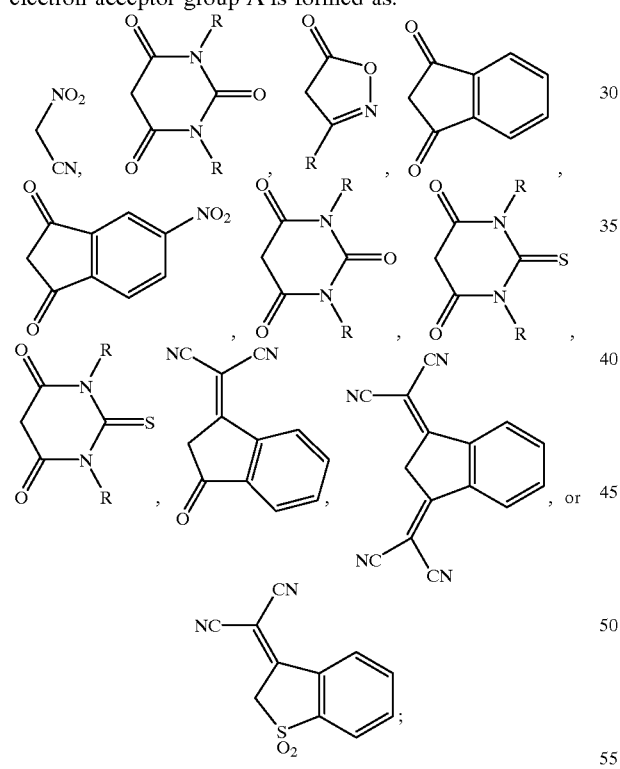

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

11. A nonlinear optical device comprising:
    an active element formed from a chromophore including
        an electron donor group,
        an electron acceptor group, and
        a π-conjugate bridge structure between the electron donor group and the electron acceptor group;

wherein the bridge structure includes at least one non-aromatic ring which lock(s) one or two carbon-carbon double bond(s) of of the conjugate bridge structure;
wherein the ring(s) is(are) five-, six- or seven-membered;
wherein the electron acceptor group is connected to the bridge ring structure with a conjugated diene or triene.

12. A nonlinear optical device comprising:
an active element formed from a chromophore including
    an electron donor group,
    an electron acceptor group, and
    a π-conjugate bridge structure between the electron donor group and the electron acceptor group;
    wherein the bridge contains a bithiophene unit formed as

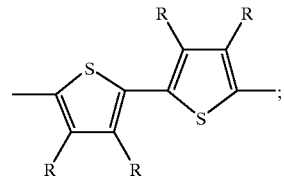

wherein R=any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;
wherein at least one of the R groups on the bithiophene has more than one carbon.

13. A nonlinear optical device comprising:
an active element formed from a chromophore including
    an electron donor group,
    an electron acceptor group, and
    a bithiophene-containing bridge structure between the electron donor group and the electron acceptor group;
wherein the acceptor is formed as

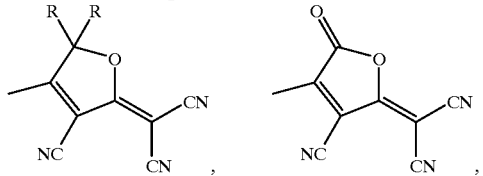

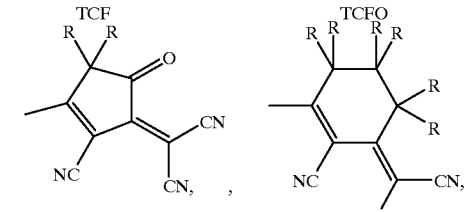

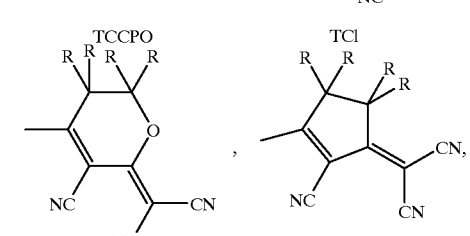

-continued

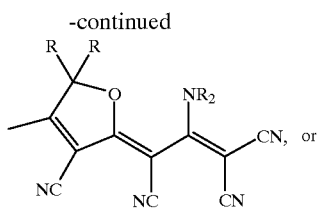

4CF

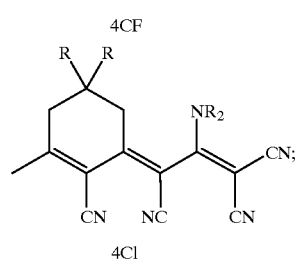

4Cl wherein R=any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

14. A nonlinear optical device comprising:
an active element formed from a chromophore including
an electron donor group,
an electron acceptor group, and
a bithiophene-containing bridge structure between the electron donor group and the electron acceptor group;
wherein the acceptor is formed as

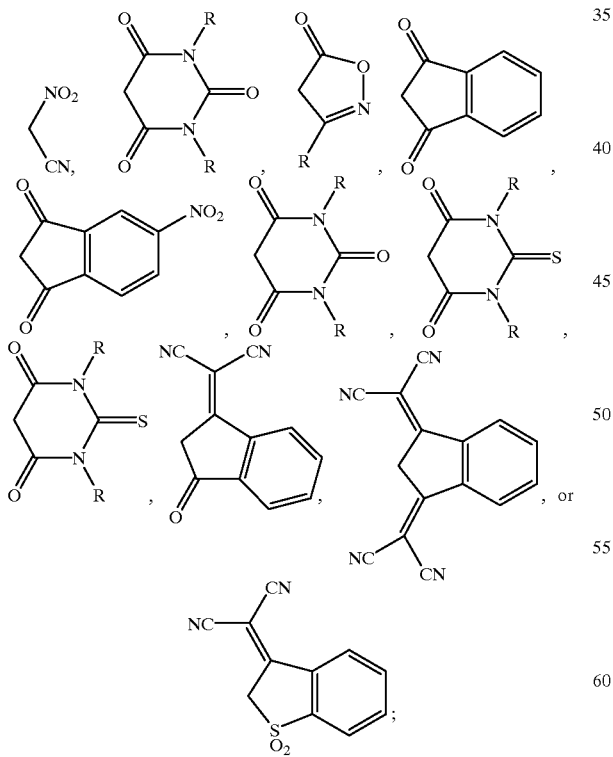

wherein R=any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

15. A nonlinear optical device comprising:
an active element formed from a chromophore including
an electron donor group,
a ring-locked tricyano electron acceptor, and
a π-conjugated bridge structure between the electron donor group and the electron acceptor;
wherein the ring-locked tricyano electron acceptor comprises

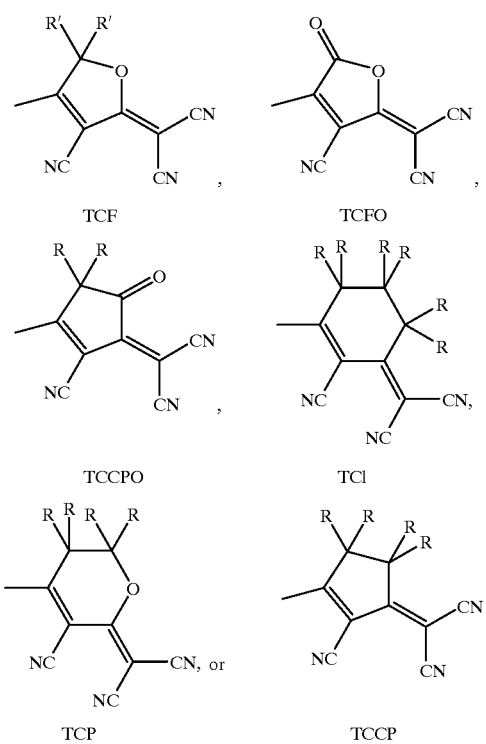

TCF, TCFO, TCCPO, TCl, TCP, TCCP wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;

wherein R'=H, F, or any perhalogenated, halogenated or non-halogenated aliphatic or aromatic group, with 1–30 carbon atoms functionalized with zero or more of the following functional groups: hydroxy, ether, ester, amino, silyl, and siloxy, and R' is not methyl or n-butyl when the two R' groups are the same.

16. A nonlinear optical device comprising:
an active element formed from a second-order nonlinear optical chromophore wherein the chromophore is doped in poly[bisphenol A carbonate-co-4,4'-(3,3,5-trimethylcyclohexylidene)diphenol carbonate]

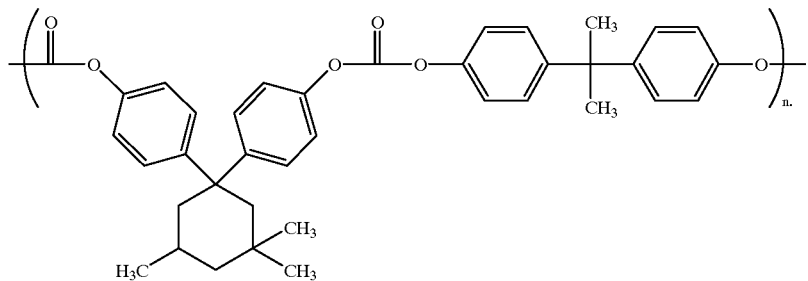

17. The nonlinear optical device of any of claims 1 to 16 wherein the device is an electro-optic modulator.

18. The nonlinear optical device of any of claims 1 to 16 wherein the device is a phase shifter.

19. The nonlinear optical device of any of claims 1 to 16 wherein the device is hermetically packaged in a gas-tight container vacuumed, or vacuumed and then filled with an inert gas including one or more of: nitrogen, helium, neon, argon, krypton and xenon.

20. The nonlinear optical device of any of claims 1 to 16, wherein the device is provided with a coating having an oxygen permeativity which is sufficiently low to hermetically seal the device.

* * * * *